US009618918B2

(12) United States Patent
O'Keeffe

(10) Patent No.: US 9,618,918 B2
(45) Date of Patent: Apr. 11, 2017

(54) SYSTEM AND METHOD FOR ESTIMATING THE NUMBER OF PEOPLE IN A SMART BUILDING

(71) Applicant: James Thomas O'Keeffe, Newark, CA (US)

(72) Inventor: James Thomas O'Keeffe, Newark, CA (US)

(73) Assignee: James Thomas O'Keeffe, Newark, CA (US)

( * ) Notice: Subject to any disclaimer, the term of this patent is extended or adjusted under 35 U.S.C. 154(b) by 0 days.

(21) Appl. No.: 15/063,142

(22) Filed: Mar. 7, 2016

(65) Prior Publication Data

US 2017/0017214 A1    Jan. 19, 2017

Related U.S. Application Data

(60) Provisional application No. 62/302,281, filed on Mar. 2, 2016, provisional application No. 62/191,537, filed on Jul. 13, 2015.

(51) Int. Cl.
*G05B 15/02* (2006.01)

(52) U.S. Cl.
CPC .................................. *G05B 15/02* (2013.01)

(58) Field of Classification Search
USPC ......................................................... 702/189
See application file for complete search history.

(56) References Cited

U.S. PATENT DOCUMENTS

| | | | |
|---|---|---|---|
| 6,645,066 B2 | 11/2003 | Gutta et al. | |
| 8,577,392 B1 | 11/2013 | Pai et al. | |
| 8,981,950 B1 | 3/2015 | Kates | |
| 9,082,202 B2 | 7/2015 | Kovesi et al. | |
| 9,245,229 B2 | 1/2016 | Fadell et al. | |
| 2012/0066168 A1* | 3/2012 | Fadell | G05B 15/02 706/52 |
| 2014/0175990 A1 | 6/2014 | Bhatkar et al. | |
| 2015/0061859 A1 | 3/2015 | Matsuoka et al. | |
| 2015/0333965 A1 | 11/2015 | Lee et al. | |
| 2015/0349883 A1 | 12/2015 | Mitchell | |
| 2016/0047569 A1 | 2/2016 | Fadell et al. | |

* cited by examiner

*Primary Examiner* — Tung Lau

(57) ABSTRACT

This disclosure concerns estimating the number of people within building-based device networks. Increasingly, local area network (LAN) devices are capable of sensing people (e.g. smart appliances). Features of building layout, and physical arrangement of devices provide that only a subset of sensor data patterns can be accounted for by a single user (e.g. simultaneous activation of a smart TV and a motion sensor). Over time, a central controller (e.g. LAN gateway) can gather these building-specific sensor patterns and learn single occupant characteristics for a network (e.g. features or boundaries of single occupant capability). In one embodiment, the central controller generates a single occupancy criterion (e.g. a building-specific test), comprising single occupant characteristics, operable to test a subset of sensor data for single occupancy. The central controller divides devices into a minimum number of groups, such that each group satisfies the single occupancy criterion and estimates the number of occupants accordingly.

30 Claims, 22 Drawing Sheets

| D1 | D2 | D3 | D4 | Freq. |
|---|---|---|---|---|
| 0 | 0 | 0 | 0 | 201 |
| 0 | 0 | 0 | 1 | 40 |
| 0 | 0 | 1 | 0 | 20 |
| 0 | 0 | 1 | 1 | 0 |
| 0 | 1 | 0 | 0 | 52 |
| 0 | 1 | 0 | 1 | 0 |
| 0 | 1 | 1 | 0 | 0 |
| 0 | 1 | 1 | 1 | 0 |
| 1 | 0 | 0 | 0 | 40 |
| 1 | 0 | 0 | 1 | 0 |
| 1 | 0 | 1 | 0 | 17 |
| 1 | 0 | 1 | 1 | 0 |
| 1 | 1 | 0 | 0 | 31 |
| 1 | 1 | 0 | 1 | 0 |
| 1 | 1 | 1 | 0 | 0 |
| 1 | 1 | 1 | 1 | 0 |

FIG. 8A

Single Occupant Characteristics

Device 1 and Device 4 must not indicate the presence of a person(s) simultaneously Device 2 and Device 3 must not indicate the presence of a person(s) simultaneously Device 2 and Device 4 must not indicate the presence of a person(s) simultaneously Device 3 and Device 4 must not indicate the presence of a person(s) simultaneously

FIG. 8B

| D1,1 | D2,1 | D3,1 | D4,1 | D1,2 | D2,2 | D3,2 | D4,2 | D1,3 | D2,3 | D3,3 | D4,3 | Freq. |
|---|---|---|---|---|---|---|---|---|---|---|---|---|
| 1 | 0 | 0 | 0 | 0 | 0 | 1 | 0 | 0 | 0 | 0 | 1 | 31 |
| 1 | 0 | 0 | 0 | 0 | 0 | 0 | 1 | 0 | 0 | 0 | 1 | 0 |
| 0 | 1 | 0 | 0 | 0 | 0 | 0 | 1 | 0 | 0 | 0 | 1 | 0 |
| 0 | 1 | 0 | 0 | 0 | 0 | 1 | 0 | 0 | 0 | 0 | 1 | 21 |

Single Occupant Characteristics

Device 1 and Device 4 can not sequentially indicate occupancy without an intermediate device Device 2 and Device 4 can not sequentially indicate occupancy without an intermediate device

FIG.9

| D1 | D2 | D3 | D4 |
|----|----|----|----|
| 90 | 30 | 5  | 0  |

1120

| D1 | D2 | D3 | D4 |
|----|----|----|----|
| 90 | 30 | 5  | 10 |

1130

1110

- 830 — Device 1 and Device 4 must not indicate the presence of a person(s) simultaneously — 0 | 5
- 835 — Device 2 and Device 3 must not indicate the presence of a person(s) simultaneously — 1 | 1
- 840 — Device 2 and Device 4 must not indicate the presence of a person(s) simultaneously — 0 | 5
- 845 — Device 3 and Device 4 must not indicate the presence of a person(s) simultaneously — 1 | 1
- 990 — Device 1 and Device 4 can not sequentially indicate occupancy without an intermediate device — 0 | 0
- 995 — Device 2 and Device 4 can not sequentially indicate occupancy without an intermediate device — 0 | 0
- 1020 — The minimum transition time between device1 and device 4 is 5 seconds — 0 | 0

| D1 | D2 | D3 | D4 | Freq. |
|----|----|----|----|-------|
| 0  | 0  | 1  | 1  | 0     |
| 0  | 1  | 0  | 1  | 0     |
| 0  | 1  | 1  | 0  | 0     |
| 0  | 1  | 1  | 1  | 0     |
| 1  | 0  | 0  | 1  | 0     |
| 1  | 0  | 1  | 1  | 0     |
| 1  | 1  | 0  | 1  | 0     |
| 1  | 1  | 1  | 0  | 0     |
| 1  | 1  | 1  | 1  | 0     |

SOC = {
 !{D3 and D4}
 and
 !{D1 and D2 and D3}
 and
 !{D2 and !D3 and D4}
}

FIG.15

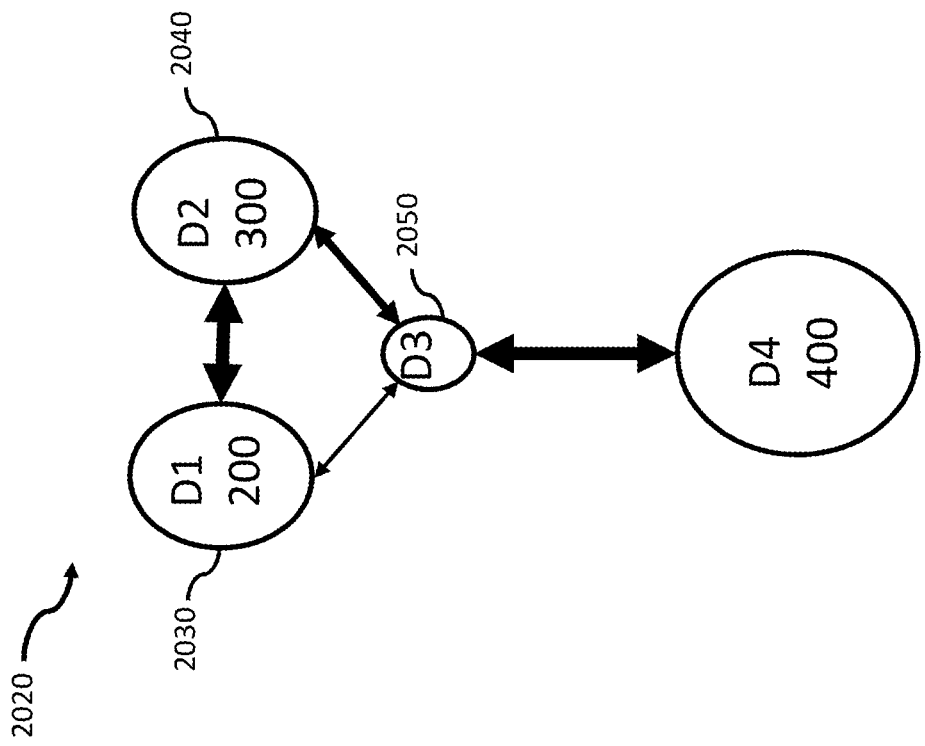

SYSTEM AND METHOD FOR ESTIMATING THE NUMBER OF PEOPLE IN A SMART BUILDING

CROSS-REFERENCE TO RELATED APPLICATIONS

This application claims the benefit of provisional patent application Ser. No. 62/191,537, filed on Jul. 13, 2015 by the present inventor and claims the benefit of provisional patent application Ser. No. 62/302,281, filed on Mar. 2, 2016 by the present inventor

FIELD OF THE INVENTION

This disclosure relates generally to counting the number of people within a plurality of devices operable to sense an aspect of the presence of a person in the vicinity of the devices.

BACKGROUND

The proliferation of internet-connected smart-building devices (e.g. thermostats and motion sensors) has led to devices frequently reporting indications of human presence. Early building automation devices (e.g. motion sensors) often relied on built-in sensors to detect occupants. Many such devices neither received data from nor contribute data to a building-wide network. Later, building automation devices were improved with networking capabilities to enable data gathering (e.g. proximity card entry systems and Zigbee sensor networks). Recently, there has been a proliferation of user-installed smart home devices. A related area of development is building-scale operating systems (OS), wherein sensor data (often from smart devices) is aggregated, processed and the resulting incites are offered as shared services to client devices in the smart building. For example, a building OS can gather sensor data, estimate the number of occupants and continuously make this up-to-date occupancy estimate available to client devices such as security systems, lighting systems, thermostats, photocopiers, smart televisions, and security cameras. Client devices can thereby better adapt to people, based on shared knowledge of the number of people in the building.

A related and arguably more difficult challenge is to continuously estimate the number of people in a dynamically defined region within a building. Commercial buildings often have electronic badge readers at the entrances for security. These are ineffective at estimating the number of occupants because they typically only register when people enter the building and people can hold the door open for others. Retail stores can have entry and exit counters at the store entrance. These are ineffective at estimating the number of occupants because multiple people can enter at once and appear to be a single person.

The outer perimeter of a building is one logical boundary within which to count the number of people but there are circumstances where it is advantageous to count the people in a dynamically defined region within a building. Equipment that counts people at building entrances is ineffective at estimating the number of people in a dynamically defined region of the building (e.g. on a particular floor or a range of office numbers). A real-time estimate of the number of occupants in a selectable region of a building is also useful for fire safety, and provisioning heating ventilation and air conditioning (HVAC) resources.

Buildings have long had automation based on occupant detectors for energy savings (e.g. motion sensors), but these do not count occupants. An example of the deficiency associated with not counting people is the classic problem automated lighting in a conference room turning off when occupants are present but stationary. Knowing the number of people in a building or regions thereof could improve the performance of automated lighting and similar automation devices and services. For example, when a person moves from one region to another motion activated lights are typically programmed with a long delay (e.g. 1-2 minute) before turning off because the system cannot discount the presence of a second stationary occupant remaining behind after the first person has left the region. An improved automated lighting system could use a continuous estimate of the number of people in the vicinity to respond more intelligently. For example, a lighting system could determine that only a single occupant is in a region of the building and could thereby track the sole occupant and turn off lights quickly behind them, because additional occupants do not have to be accounted for.

One challenge that sensor networks face when estimating the number of occupants in a building is that several sensors can detect the same occupant at once (e.g. two motion sensors or cameras with overlapping fields of view). This problem is called co-site or aliasing. It is difficult for a network of sensors to differentiate between simultaneous detection of a single occupant with multiple sensors and multiple occupants on several sensors. Hence as far as I am aware no method previously disclosed effectively provides a realtime estimate of the number of people in a selectable region of a building.

SUMMARY

It is impossible for two people to occupy precisely the same space. Therefore the process of estimating the number of people in a network of sensors can be reduced to gathering sufficient sensor data to distinguish each person and remove aliasing, whereby aliasing is a situation where a person is counted multiple times. For an array of sensors with known relative placement (such as a CCD array on a digital camera) the possible cross correlations between sensors can be characterized by the manufacturer. Hence a CCD camera can identify the number of faces (or people) in an image based in part on the known relative placement of the CCD elements. Consider however a random arrangement of smart devices in a smart home (e.g. IP Cameras, motion sensors, smart door locks and smart thermostats). Some devices can sense a person from far away (e.g. a motion detector) while others can provide specific indications presence when a person performs a specific action (e.g. opening the refrigerator door). Collectively these smart building devices form a patchwork with regions of double coverage (or multiple coverage) and regions of the building with no coverage. In this context, aliasing (e.g. when one person is sensed by multiple devices) and undercounting (e.g. when a person is not sensed) are significant challenges when trying to estimate the number of people. One technique to addressing this problem is to manually train a processor (e.g. a central controller, computer, a smart home hub or a computer at a security company) regarding regions of the building where multiple devices can detect a single person simultaneously. This manual training process can be time consuming and often requires professional installation and calibration. An improved central controller for a network of devices in a building would be able to automatically learn those circumstances where a single person is sensed by multiple devices, without the need for manual calibration.

Various aspects of the present disclosure provide systems and methods for estimating the number of people in a building. Sensor networks are well suited for simultaneously report sensor data to a central computer (e.g. central controller). One example of a sensor network is a plurality of network-connected smart devices in a smart home. Network-connect smart devices (e.g. refrigerators, door locks, thermostats and motion sensors) often have stationary placement. In some embodiments the disclosed methods take advantage of this to identify and characterize relationships between concurrent and sequential sensor data reported by such devices. Such cross-correlations in sensor data from smart building devices are difficult to predict and difficult to perceive by humans. However, such cross-correlation of sensor data can be tracked and characterized by a central controller connected to receive sensor data from a network of devices in an enclosed space.

In one aspect of this disclosure characterization of a network of smart building devices is performed when a single occupant is present, thereby identifying the bounds of the variable space that can be accounted for by a single person. This characterization is stored and forms the basis of a method to subsequently estimate the number of people in a region of a building. It can be appreciated that at any point in time an enclosed space can be divided into a number of single occupant zones (e.g. the personal space surrounding the person) wherein all presence indications (e.g. sensor data) in each single occupant zone can be accounted for by a single person. In several embodiments the disclosed methods teach how to characterize the enclosed space in order to estimate the minimum number of such zones in the enclosed space at any point in time.

In a first embodiment a network of devices in an enclosed space (e.g. a building) is operably to transmit training data to a central controller. The central controller is assumed to have no initial knowledge of the arrangement of devices within the network. The central controller can determine periods of times when only one person occupies the enclosed space with the network of devices, for example based on knowing the number of active cellular telephones in the building or time of day. Upon determination, with sufficient confidence, that a single person occupies the enclosed space with the network of devices the central controller enters a training phase. In the training phase the central controller can record training data from devices and thereby build a database indicative of the bounds of the training data that can be accounted for by a single occupant. The central controller can learn patterns of devices that can be simultaneously or sequentially activated by a single person. For example, in the first embodiment the network of devices can comprise N devices, connected to transmit training data to the central controller. At any point in time the most recent training data from the N devices can be represented as a vector with N dimensions. During the training phase the central controller gather training data vectors and observe the frequency of commonly occurring vectors. The central controller can generate a hash table representing the frequency of particular N dimensional vectors representing concurrent sensing of a single person by the devices in the network. It can be appreciated that over time the frequency distribution of possible single occupant patterns will emerge. Unpopulated vectors in the hash table can represent sequences of sensor data that cannot be generated by a single occupant.

Therefore one aspect of the present disclosure is that a central controller can use a high confidence indication of single occupancy in an enclosed space to initiate learning of data patterns (e.g. parts of the variable space) that could otherwise easily be confused with multiple occupancy (e.g. co-site by multiple sensors). Therefore strong indications of single occupancy can initiate learning of the detailed boundaries of single occupant capabilities including non-intuitive patterns of training data that a single occupant can create.

The central controller can process the aggregated training data to determine a plurality of characteristics that are satisfied by the training data when a single person occupies the enclosed space with the network of devices. In the first embodiment the central controller generates a set of single occupant characteristics (e.g. rules) based on the training data, indicting the bounds of the variable space that can be accounted for by a single occupant. Collectively, the set of single occupant characteristics form a single occupancy criterion (SOC). The SOC can represent a unique signature for the enclosed space, based on the geometry and layout of the device network. The SOC is a set of characteristics which when satisfied by a subset of the devices from the network of devices indicates that the training data associated with that subset can be accounted for by a single person (i.e. it is plausible that a single person generated that subset of training data).

In the first embodiment, following the generation of the single occupancy criterion (SOC) the central controller can select a plurality of devices from the network of devices, where each device in the plurality id operable to sense the presence of a person in at least a portion of a region of the enclosed space. The central controller can select sensor data corresponding to the plurality of devices and apply an occupancy test method to the sensor data. The occupancy test method can estimate the number of people in the region with the plurality of devices and can include the following steps: (1) applying the single occupancy criterion to a subset of the plurality of devices (2) generating a set of subsets of devices from the plurality such that sensor data for devices in each subset satisfies the single occupancy criterion with respect to all other devices in the subset, (3) growing subsets by adding additional devices where possible and generating new subsets when no existing subset can accept a candidate device, (4) stopping when each device in the plurality is represented in at least one subset and (5) estimating the number of people in the region based the number of subsets necessary to complete the occupancy test.

The occupancy test can be a method whereby the SOC is iteratively applied to various subsets of sensor data from the plurality of devices. In this way subsets of devices for which the corresponding sensor data satisfies the SOC can be generated or identified. Existing subsets of devices satisfying the SOC can be enlarged by successively adding new devices form the plurality. Similarly, if a candidate device cannot be placed in any existing subset (e.g. when the associated sensor data will not enable the SOC to be satisfied with any existing subset) a new subset is generated corresponding to that device and the associated sensor data. The process of growing existing subsets whenever possible and generating new subsets when necessary can continue until all devices in the plurality of devices are accounted for in at least one subset. In this way the method can continually generate the minimum number of subsets that can plausibly be explained by a single occupant. The Single Occupancy Criteria serves to determine the plausibility that a subset of data from a time period can be accounted for by a single occupant. In several embodiments when each device of the plurality have been accounted the number of occupants in a region containing the plurality of devices is estimated based on the number of subsets needed to complete the occupancy test method. The occupancy test provides a rigorous method to account for all of the sensor data while satisfying the SOC.

Over the course of multiple training sessions, the SOC can be refined to represent the detailed thresholds of behavior (e.g. boundaries of the N dimensional variable space) that can be accounted for by a single occupant within the network of devices. The single occupancy criterion can also be updated over time to account for sporadic repositioning of the devices in the plurality of devices. In some embodiments the occupancy test successively generates subsets of the second plurality with the largest number of previously unaccounted for devices in the plurality. In this way the central controller can generate the minimum number of subsets necessary to complete the occupancy test while fulfilling the SOC within each subset. The SOC provides a detailed and unambiguous set of tests for determining if sensor data from a subset of the plurality of devices can be accounted for by a single person.

Neither the occupancy test method nor the SOC are fundamental mathematical principals or formulae. Specifically, the SOC is a set of characteristics dependent on the layout of the building and the placement of the network of devices. For example, a single occupant characteristic can state that sensor A and sensor B cannot be simultaneously activated by a single person and this can be represented as !(A & B) or NOT(A & B)).

In some embodiments the SOC is satisfied if one or more single occupant characteristics in the SOC are satisfied. In some embodiments the SOC is satisfied if all single occupant characteristics in the SOC are satisfied. In some embodiments each single occupant characteristic is scored according to the sensor data from a subset of devices, thereby indicating a measure of the probability that specific subsets of sensor data can be accounted for by a single occupant. The SOC can be satisfied by a subset when the score satisfies a scoring criterion.

In some embodiments the estimated number of people in a region is based on a previous estimate. For example, the estimated number of people can be a weighted average of the present and previous estimated number of people or subsets, thereby reducing the variance of the estimated number of people. In other embodiments a target number of people can be stored (e.g. based on a previous estimate of the number of subsets or people). Detection threshold for one or more devices from the plurality of deices can be adapted in order to "search" for one or more people that were indicated by the previous target number of people present. For example, several applications of the occupancy test can indicate that two people are present in a smart building. Subsequently the occupancy test may generate a result indicating a single person in the building. The central controller can modify a threshold for sensor data and reapply the occupancy test iteratively to search for the second person. In this way a consistent SOC can be applied to increasingly detailed sensor data in an effort to discern the location of the second person.

In another embodiment the central controller can employ a method to match the number of people estimated in the occupancy test to a previous estimate while selecting subsets to minimize or maximize a combined score.

Advantages

The system and method described in this specification can be implemented to achieve the following exemplary advantages:

The occupancy test method can provide an up-to-date estimate of the number of people in a selectable region of an enclosed space. The latest estimate for a region can be made constantly available to client building automation devices.

The occupancy test method can be rapidly and repeatedly performed, particularly once a stable SOC has been generated. Repeated application can highlight sporadic but important times when the true number of occupants is reflected. For example, it can be established that the number of people on a floor of a building is most accurately provided by the peak values resulting from repeated application of the occupancy test method. In another example a crowded office building may always have some degree of underestimating the number of people. Therefore repeated application of the occupancy test method at 0.5 Hz over 10 seconds may yield the following results numbers of subsets (23, 27, 24, 25, 21). The number of people in the office building can be estimated based on the peak value of 27. Alternatively the number can be estimated as the peak plus one standard deviation (e.g. 29 total people to account for some under reporting).

In another example two people working quietly in a house may generate an occupancy estimate of 0 or 1 for periods of time. However the central controller can use those occasions when the occupancy test method returns a value of 2 (i.e. the number of subsets in the set of subsets) to generate an estimate of 2. In this way the central controller can instruct home automation services to account for the comfort of 2 people (e.g. with lighting and heating) even though the instantaneous occupancy test results only rarely correspond to actual number of occupants in the building.

In another advantage the described occupancy test method does not require knowledge of the layout or overlap of device ranges at the time of installation. The occupancy test method can adjust detection threshold to attempt to search for people that were present in previous estimates. A central controller can compare a recent estimate of the number of people in the second plurality of devices with a previous or time averaged occupancy estimate for the first or second plurality. In this way the central controller can identify a number of people that are unaccounted or based on a recent application of the occupancy test method. The central controller can vary aspects of building automation devices (e.g. lighting, heading or speakers) according to a number of people that cannot be accounted for in the recent occupancy estimate. For example, if two workers occupy a region with a plurality of devices and can both be accounted for in their respective offices then lighting in a conference room or hallway can be turned off. However if the result of the most recent occupancy test returns an estimate of 1 the central controller can instruct the lighting scheme increase the timeout value and keep lights on in some locations to facilitate the unaccounted for occupant.

The occupancy test method enables the operation of automated building services (lighting, heating, music) can be improved. For example, a central controller can estimate a number of occupants are in a conference room and can keep the lights on even if the occupants are sitting quietly and have not activated a motion sensor in some time.

The disclosed method can provide an up-to-date estimate of the number of people in a region of a building in the event of an emergency (e.g. fire). Similarly the disclosed methods enable emergency personnel to define customized regions in which to estimate the number of people.

In another advantage the occupancy test method can be used to help security personnel in office buildings, wherein occupants can be counted and security personnel can be provided a up-to-date estimate of the number of occupants.

Therefore a security guard making nightly sweeps of a building would know how many people to look for.

By characterizing the enclosed space when one occupant is present, some of the techniques in this specification can be implemented to characterize the minimum time required to transition between pairs of devices (e.g. at opposite ends of a building) as well or possible and impossible sequences of device activation. In this way the single occupant characterization can be used to estimate the layout of the network of devices and the layout of the enclosed space. The estimated layout of the enclosed space can improve the timing of automated services (e.g. Lighting and Music) by providing estimated transition times between an occupants location and other rooms (e.g. distance from living room to Master Bedroom).

DRAWINGS

FIG. 8A illustrates a hash table with aggregated training data according to an embodiment of the present invention.

FIG. 8B illustrates a number single occupant characteristics according to an embodiment of the present invention.

FIG. 9 illustrates a plurality of sequences of training data and associated single occupant characteristics for an exemplary enclosed space in accordance with an embodiment of the present invention.

FIG. 11 illustrates a single occupancy criterion comprising a plurality of single occupant characteristics in accordance with an embodiment of the present invention.

FIG. 15 illustrates a single occupancy criterion comprising a plurality of single occupant characteristics in accordance with an embodiment of the present invention.

FIG. 20A illustrates an exemplary transition matrix between pairs of devices in a plurality of devices in accordance with an embodiment of the present invention.

FIG. 20B illustrates an exemplary network graph of the devices in an enclosed space in accordance with an embodiment of the present invention.

DETAILED DESCRIPTION

Figure 1B:
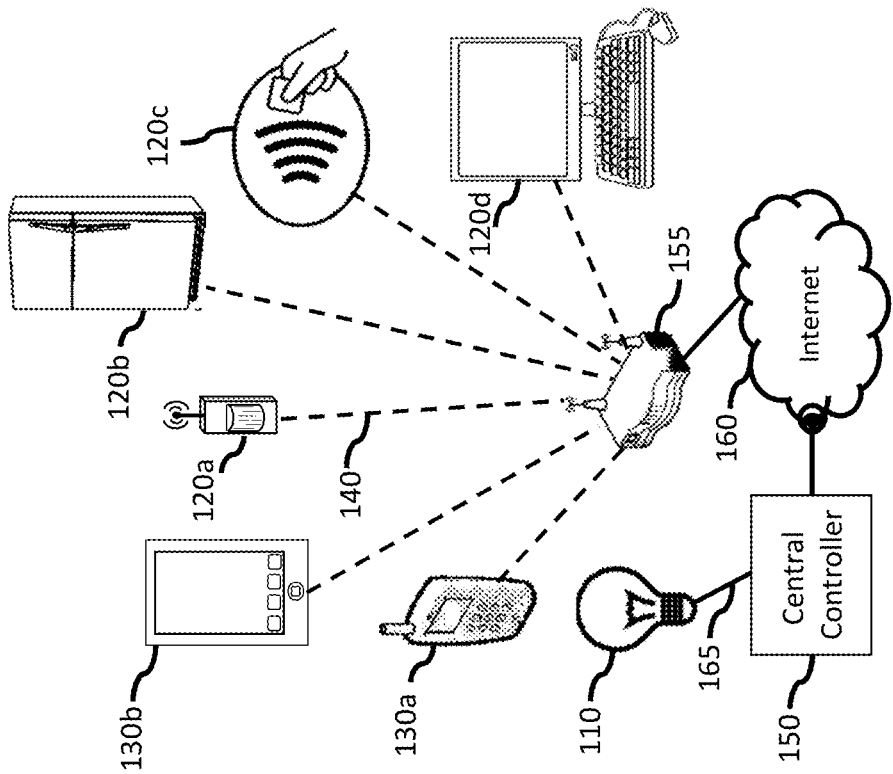
FIGS. 1A and 1B illustrate a number of exemplary first devices transmitting data to a central controller.
Figure 1A:
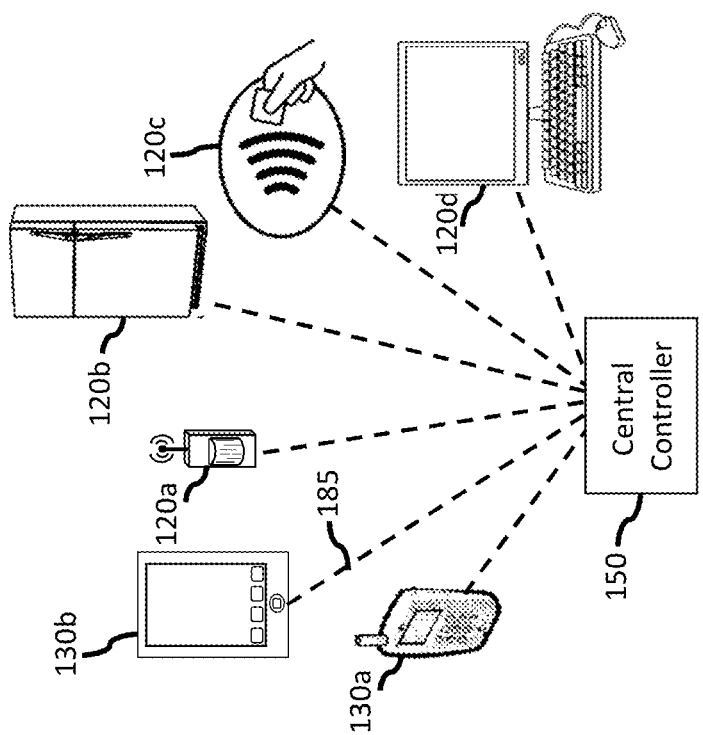

Several embodiments of this disclosure provide a computer implemented method to estimate the number of people in an enclosed space. A set of devices can report data indicative of the presence of one or more people within the enclosed space to a computer operable to estimate the number of people within the enclosed space. For the purposes of this disclosure the set of devices reporting data indicative of person presence in an enclosed space to a computer or central controller 150 can be considered a network of devices. The enclosed space can be a wide variety of structures such as a home, office building, ship, warehouse, theatre, school, sports arena or aircraft. A first step in several embodiments of the method is to gather data from a network of devices indicative of people present in the enclosed space. FIG. 1A and FIG. 1B illustrate exemplary devices operable to be part of a network of devices reporting sensor data (or in some cases training data) indicative of the presence of one or more people to a central controller.

Exemplary devices can include network-connected smart devices and mobile wireless devices. In the context of this disclosure a network-connected smart device is a device associated with a building that is operable to connect to a communication network. Exemplary network-connected smart devices include motion detector 120*a*, smart refrigerator 120*b*, RFID badge reader 120*c* and computer 120*d*. Increasingly, modern "smart" versions of legacy appliances are network connected smart devices and have the capability to connected to a local area network (e.g. Wi-Fi, LAN, X10, ZigBee, Ethernet) or wide area network (e.g. a 3G-4G cellular network, GPRS or WiMAX, WAN). In one aspect, network-connected smart devices can transmit information regarding changes in operating state or sensor readings indicative of direct user interaction (e.g. transmitting door unlock requests over the world wide web to a remote server). Additional examples of network-connected smart devices operable to report the presence of a person include thermostats, door-locks, washing machines, light switches, power outlets, smart doorbells and light bulbs. In some cases a primary function of a network-connected smart device is to sense the presence of a person (e.g. a motion sensor 120a or IP cameras 120e). Other network-connected smart devices can fulfill a primary function other than sensing a person (e.g. refrigerating food) but nonetheless provide highly localized indications of human presence when a person interacts with them. For example, opening the refrigerator door or adjusting a thermostat can provide a clear indication of occupancy in a discrete region of a building. Hence as more devices become network capable using wireless (e.g. Bluetooth or Wi-Fi) or wireline (e.g. ethernet-over-powerline) methods an increasing number of devices can report the presence of a person. Network-connected smart devices are operable to transmit sensor data indicative of a measure of the presence of a person in signals 140 to a central controller 150.

For the purpose of this disclosure sensor data can be data reported by a device indicative of the presence of a person. Sensor data can be generated in response to direct user interaction with the device (e.g. opening the refrigerator door, changing the temperature on a thermostat, or pressing buttons on a washing machine). Sensor data can also be generated by indirect user interaction when a device senses a person in the vicinity of the device (e.g. an IP camera sensing a person in the field of view or a sound sensor hearing a sound that can be indicative of human activity). Several network-connected smart devices are operable to be remotely activated. For example, a person can connect to their smart lighting network from their smartphone and remotely turn ON/OFF lights. In one aspect of several embodiments of the disclosed methods sensor data can differentiate between remote operation and direct user interaction indicating the presence of a person (e.g. between remote activation of a light switch and a person physically actuating the switch).

Training data can be a special subset of sensor data that is reported by devices when a training criterion is satisfied. For example, if a central controller determines with sufficient accuracy that only one person is present in a region of the enclosed space a portion of the subsequent sensor data can be classified as training data. Training data can be regular sensor data received during a time when a training criterion is satisfied. In other embodiments training data can be specialized sensor data with increased precision (e.g. measurement accuracy), or increased frequency, or is synchronized based in part on satisfaction of a training criterion.

In some embodiments, some or all of the devices send (or push) messages to a central controller upon sensing an aspect of a person (e.g. direct human interaction, motion or sound indicating the presence of one or more people). For example, a desktop computer 120d can transmit signals to a central controller 150 with information relating to user login, keystrokes, mouse movements or a person detected on a connected or built-in camera or microphone.

Network-connected smart devices can include building infrastructure equipment such as RFID or magnet badge readers 120c or an automatic faucet in a bathroom, operable to report the presence of a person to a central controller 150. In one aspect, the devices in the network do not have to be in the enclosed space but often have at least a sensor within the enclosed space or measure presence based on monitoring signals from a device in the enclosed space. For example, the network of devices can include a smart electrical meter or smart circuit breaker that can be connected through power wires installed a building to electrical loads in various rooms. Electrical loads often modulate in response to the presence of a person or direct user interaction (e.g. turning on a fan or changing television channels). These variations can be sensed by the network-connected electricity meter or circuit breaker based on signals (power variations) transmitted by sensors (e.g. electrical loads) and subsequently reported in sensor data to the central controller. For example, small fluctuations in power usage at a particular circuit breaker can be identified and later correlated with specific electrical loads and further correlated with the presence of a person. In a similar example the network can include a smart water meter or leak detector such as WeMo® Water available from Belkin Inc. of Los Angeles Calif. These can be used to correlate presence in various parts of a building with the sounds and pressure changes in water pipes. An interesting aspect of this disclosure is that no prior knowledge of the placement of loads or their correlation with human presence is required at this first step. Several of the disclosed methods enable these correlations to be identified and used to dynamically estimate the number of occupants.

In addition to network-connected smart device, an enclosed space (e.g. a building) can contain one or more mobile wireless devices. These are operable to form part of the network of devices and transmit presence information to the central controller 150. Exemplary mobile wireless devices include smartphone 130a, tablet PC 130b and wearable electronic devices. Mobile wireless devices are operable to transmit second signals 185 with sensor data or training data to the central controller 150.

In some embodiments devices can communicate and transfer data between one another in the process of transmitting data to a central controller. Examples of protocols operable to enable inter-device communication (or mesh networking) include IPV6, Zigbee, CANBUS etc. The network of devices can be part of larger superset of devices including network connected devices attached to the outside perimeter of a building or covering the grounds of a building (e.g. a network of CCTV cameras or a Zigbee network monitoring a field of crops).

Sensor data can be based on identifying a distinct action performed by a person e.g. swiping a badge at a card reader, or turning on the coffee maker. Presence indications can also be contained in variations of signal quality features caused when a person is proximal to a radio transmitter. In this way sensor data indicative the presence of a person can be gathered by a central controller 150 by observing variations in signal quality aspects of signals such as 140 and 185 received from devices in the network. For example a person moving near a short range wireless transceiver (e.g. the Bluetooth or Wi-Fi transceiver in a smartphone or network connected smart device) can cause variations in quality aspects of signals 140 and 185 received by the central controller (e.g. variations in received signal strength indication (RSSI) or bit error rate variation associated with a person moving close by). Therefore variations in signal quality aspects in first signals 140 and second signals 185 can indicate the presence of a person and be one type of sensor data reported by devices in the network.

In some embodiments transmission of training data and sensor data can be event driven, e.g. a desktop computer can transmit sensor data indicative of the presence of a person to a central controller when a person types on a keyboard. For example a motion sensor 120a can transmit sensor data upon sensing motion above a detection threshold. In some embodiments the central controller can send signals to one or more devices requesting sensor data. For example, a sound sensor that detects a sound that can be indicative of the presence of a person may transmit this information to the central controller 150 and in turn the central controller my request one or more devices in the network to report sensor data (e.g. nearby motion sensors).

Devices in a network can perform local processing to remove background noise sources. In another example a network connected smart device can identify the maximum or minimum measured sensor values and transmit those as sensor data in signals to the central controller. A network-connected smart device may adapt to account for background noise or motion and thereby increase the specificity for person presence detection. For example some motion sensors use ultrasound and passive infrared detection to increase the accuracy of presence detection.

In FIG. 1A the central controller 150 receives signals directly from some or all reporting device in the network. Central controller 150 can receive signals 140 and 185 from device, including network-connected devices and mobile wireless devices using any of a variety of custom or standard wireless protocols (Wi-Fi, Bluetooth, Zigbee, 3G/4G, 6LoWPAN, Z-wave etc.). Central controller 150 can further receive signals from devices using a variety of custom or standard wired protocols (Ethernet-over-powerline, USB, CAT6 Ethernet, I2C etc.). In FIG. 1A central controller 150 can be a smart home internet gateway such as Qualcomm® VIVE™ available from Qualcomm Inc. of San Diego Calif. In some embodiments central controller 150 can be a standalone fixed location device, similar to a Wi-Fi router or DSL modem.

In FIG. 1B signals from some or all devices are aggregated at a network gateway 155. The network gateway can serve as a bridge between a local area network and a wide area network (e.g. the World Wide Web). Network gateway 155 can be a building-based wireless router such as model TG852G available from Comcast Corporation of Philadelphia Pa. The network gateway 155 can be located in or close to the building. In other embodiments the network gateway 155 can be a bridge between a sensor network protocol (e.g. Z-wave, BLE, Zigbee) and an internet protocol, such as the SmartThings hub available from SmartThings Inc. of Palo Alto Calif. The network of devices can be operably connected to transmit sensor data and training data to a remotely located central controller 150 through the network gateway 155 via a connection to the internet 160. The central controller 150 can be remotely located (e.g. in a data center) and can service many buildings at once. In some embodiments network gateway 155 can gather sensor data from first signals 140 from one or more devices in the network and relay one or more signals to a central controller using a protocol different from that used to form the first signals. For example first signals 140 may be received as low-energy Bluetooth packets at a network gateway 155. The network gateway may aggregate sensor data from one or more first signals and form internet protocol packets (e.g. UDP or TCP/IP) that are transmitted to a remote located central controller 150. In another embodiment first devices could transmit Bluetooth packets with internet protocol format (e.g., IPv6) to a network gateway 155 enabling a more direct relaying of the packets through a Bluetooth enabled relay server to a central controller. The central controller can be located up to several thousand miles away and require complex routing of the internet protocol packets through one or more routers to reach the central controller. In another embodiment the central controller may be located in the building and access remote memory storage located a long distance away via a communication network such as World Wide Web, cellular wireless communication or FTP. In several embodiments central controller 150 can transmit signals 165 to control one or client devices (e.g. light bulb 110) in the enclosed space. In several embodiments aspects of client devices (e.g. light bulb 110) can be controlled based in part on the estimated number or people in a region based on an occupancy test methods. For example a smart television can benefit from knowledge of the number of family members in the TV room. Exemplary client devices include building automation devices (e.g. doors, lighting and HVAC) as well as many types of smart consumer electronics (e.g. smart televisions, music systems). Exemplary control aspects of client devices include latency, power state and content recommendations). In some cases the client device can be a network-connected smart device capable of both reacting to commands or occupancy estimates for a central controller and operable to transmit presence indications in signals to the central controller.

In one embodiment it can be beneficial to divide the hardware used to perform the occupant counting method between the enclosed space and a remote data center. A remotely located computer can characterize many buildings based on training data. This remote characterization can perform complex pattern recognition and cross-building learning. For example an internet provider can sell a smart home kit and can identify recurring cross-correlations between their installed device suites. In particular the internet service provider can identify the arrangement of the sensors from their reported concurrent patterns of sensor data and the provider can identify those cross correlations that can be accomplished by a single occupant. This learning can be downloaded to smart home controller thereby enabling low latency and autonomous automation.

At any point in time the most recent sensor data from a network of devices can be represented as a multi-dimensional vector. For example, imagine a house with a network of N devices each reporting one byte of sensor data with a range of 0-255 from one onboard sensor. At any point in time the most recent sensor data from the N devices can be represented in a vector of data comprising N bytes or having N dimensions. For N=4 a vector v1 describing the sensor network has 4 dimensions (e.g. v1={126, 0, 0, 255}). It can be appreciated that there are $256^4$=4294967296 possible vectors of sensor data for N=4. Each of the possible vectors can have one or more attributes. For example an attribute associated with a vector can be: "This combination of sensor data can be generated by a single person moving in the building" or "This combination of sensor data can be generated when the network of devices is unoccupied". Examples of sensor data that can be transmitted when the network is unoccupied include the sound of a refrigerator or the thermal signature of a HVAC system. A truth table with all possible sensor data vectors for the 4 devices in the above example would require 4.3 gigabytes to storage in computer memory. Therefore characterizing the 4 device network by recording attributes corresponding to each possible combination of sensor data would be time consuming and memory intensive. The process would not be processor intensive however. In many cases it is therefore better to perform processing to generate rules that describe the boundaries of groups of vectors within N-dimensional variable space, where an attribute changes value (e.g. the boundary of sensor data that can be explained by a single occupant). For example, it is simple to develop a rule that states "When all sensor values are in the range 0-127 sensor data can be accounted for by the building HVAC system". This rule establishes a boundary in the variable space that identified a $\frac{1}{16}^{th}$ portion of the total variable space where sensor data from all 4 devices is below 128. A vector of sensor data can easily be evaluated according to this rule to see if it has the attribute that it can be generated by the building HVAC system. Application of this rule is preferable to storing an attribute for all possible vectors. Hence characterization of a device network to identify rules, can offer a considerable advantage, particularly when one or more devices can report a large range of values (e.g. 256 or 65536 possible values), because this can quickly grow the size of the variable space. A device reporting sensor data from multiple sensors (e.g. a microphone and a motion sensor) can be represented in the truth table with a separate column for each sensor. Alternatively sensor fusion can be performed at the device or at central controller 150 to reduce a multisensory device to a single dimension in a truth table representing the combined presence indication from the multiple sensors.

Devices operable to sense the presence of a person often have circuitry or digital logic to apply a detection threshold criterion to sensor samples. For example, many motion sensors use a multi-stage operational amplifier to amplify small thermal variations sensed by a passive infrared sensor. The final stage of the operational amplifier often has a large gain factor effectively producing a digital voltage output (e.g. 5V=MOTION, 0V=NO MOTION). Similarly, a network-connected smart device can have digital logic circuitry that converts all sensor values above some detection threshold to an indication that presence is DETECTED and sensor readings below the threshold are reported as presence UNDETECTED. In some embodiments the detection threshold is applied locally at the device (e.g. a threshold voltage established by a circuit component or a threshold value applied digital sensor readings by a microcontroller). In other embodiments the device may report raw sensor data to a central control where a detection threshold is applied to the sensor data. For example, in the previous example a central controller can receive sensor data from four devices and quickly convert all sensor data below 128 to UNDETECTED or 0 and values above at or above 128 to DETECTED or 1. This process effectively reduces the range of the dimensions of the solution space from 256 possible values or 2 values for each device and thereby can generate a much simpler truth table of only 16 possible vectors. While applying a detection threshold can simplify processing of sensor data, significant correlations between devices can be lost. Further, the best choice of detection threshold to best differentiate between zero occupants, one occupant and multiple occupants within range of a device can vary from one installation to the next. In one aspect of several embodiments detection threshold for devices are generated or modified based on aspects of the characterization during the training phase. The network-specific detection thresholds can work in combination with the single occupant criteria (SOC) to better define the bounds of single occupant behavior in the variable space.

It can be appreciated that the choice of detection threshold can produce a variety of frequency distributions for each of the possible sensor data vectors representing the possible states of the network of devices. Therefore in one aspect of this disclosure, upon satisfaction of a training criterion, raw training data can be "mined" for rules or characteristics indicating the detailed cross-correlations between network-connected smart devices by varying the detection thresholds applied to raw sensor data. For example, a training criterion may require that only a single person can occupy the network of devices. Upon satisfaction of the training criterion a central controller may enter a training phase and instruct network connected smart devices to report higher precision or more frequent training data than standard sensor data. The central controller may relax or lower detection thresholds on the gathered training data in order to identify small yet highly indicative cross-correlations between sensor data from various devices. The central controller can subsequently generate single occupant characteristics that are better able to delineate the bounds of the variable space operable to indicate single occupancy. In this way the present disclosure enables the detection thresholds and single occupant characteristics to be generated such that the accuracy of counting the number of people in the building is improved.

In one embodiment of the present disclosure a plurality of single occupant characteristics (i.e. rules) are generated, indicative of the bounds of a multi-dimensional variable space that can be accounted for by a single occupant in a network of devices. Sensor data is gathered from a plurality of devices, corresponding to a region of the enclosed space, wherein the plurality is a subset of the network of devices. The method identifies a set of subsets of the plurality of devices such that the single occupant characteristics are satisfied by the sensor data corresponding to each subset. The number of people within sensing range of the plurality of devices is calculated based on the number of subsets necessary such that all devices in the plurality are accounted for in at least one subset.

Network-Connected Smart Devices

Figure 2:
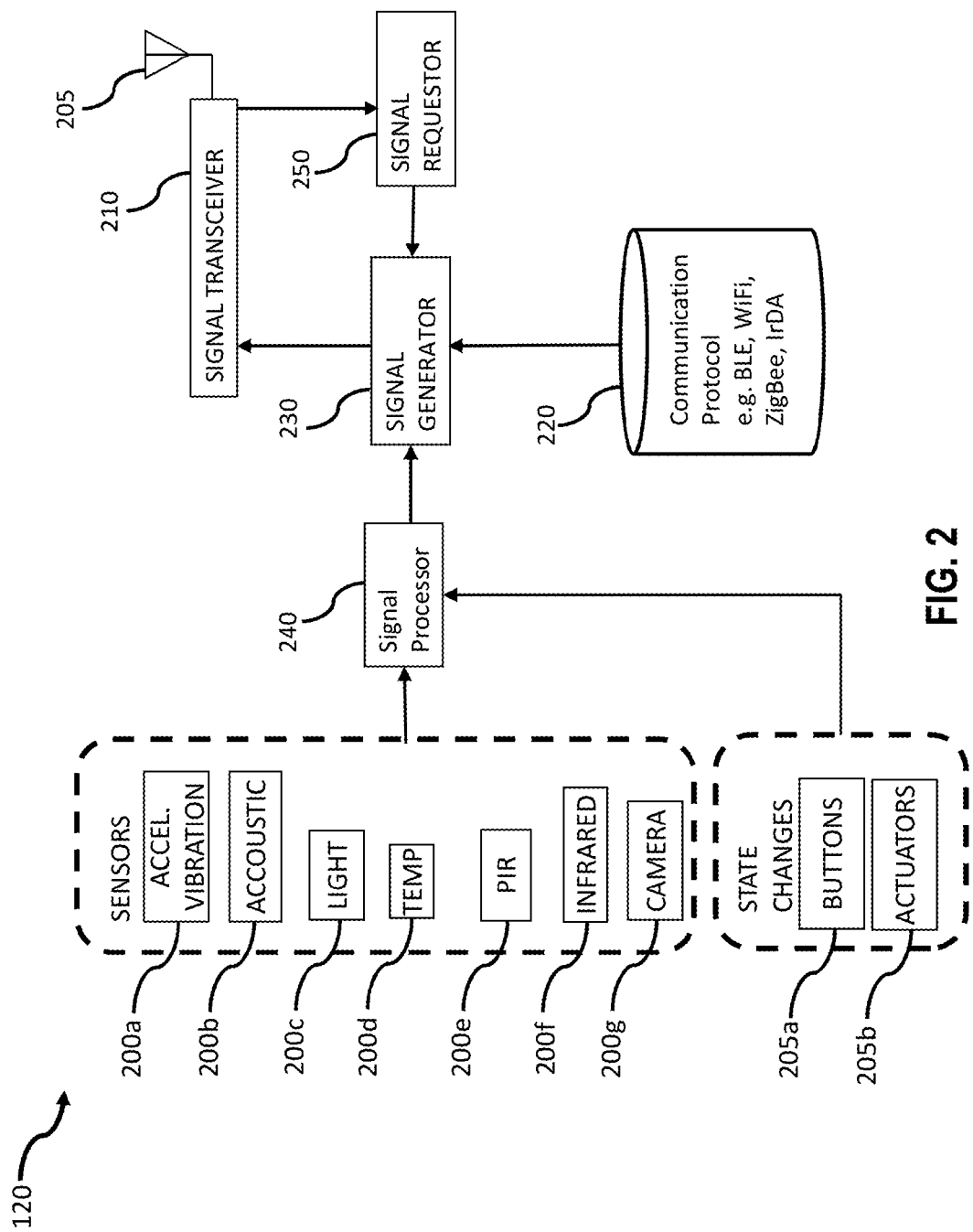
FIG. 2 illustrates an exemplary network-connected smart device in accordance with one embodiment of the present disclosure.

FIG. 2 illustrates an exemplary network-connected smart device 120 in accordance with one embodiment of the present disclosure. Central controller 150 can receive first signals 140 from one or more network-connected smart devices 120, associated with a building. Network-connected smart devices 120 can sense occupancy in a region around the device (e.g. an omnidirectional region around the device) and can have little or no specificity to or association with a particular person. Network-connected smart devices 120 can be attached to a building structure or have transitory placement within a building or on a building exterior (e.g. external security camera or motion detector).

Network-connected smart devices 120 can have one or more sensors operable to sense an aspect of a person in the vicinity of the sensor. Examples include wireless home security sensors such as infrared motion detectors, magnetic proximity sensors, sound detectors, room entry and exit detectors, baby monitors, ultrasonic motion sensors and wireless security cameras. Other types of network-connected smart devices 120 can report occupancy based on user interaction such as a button push or breaking an electrical contact, for example wireless window sensors, door sensors, door locks and a security system keypad.

A network-connected smart device 120 can be part of a larger electronic appliance (e.g. a wirelessly enabled refrigerator, television, coffee maker, door lock or washing machine). Many manufacturers are now installing Bluetooth, Zigbee and Wi-Fi transceivers in these appliances for the purpose of reporting occupancy based on direct or indirect user interaction. Another example of a network-connected smart device is the Amazon Echo speaker available from Amazon Inc. of Seattle Wash. The Echo speaker contains a plurality of microphones and can transmit short range Bluetooth and Wi-Fi signals containing occupancy indications.

In some embodiments a smart device is a client devices 110 (e.g. light bulb) with wireless control capability (e.g. wireless motion sensor 120a can be housed in a common electronics enclosure with a wireless light bulb 110). The combination of the sensor and client device can share a transceiver for sending first signals 140, including status and state of the client device 110. FIG. 2 illustrates an exemplary network-connected smart device 120 in accordance with one embodiment of the present disclosure. Each network-connected smart device can contain one or more sensors (e.g. 200a-g) operable to sense an aspect of a person. Sensors can include passive infrared (PIR) and active infrared sensors such as found in security systems as well as thermal, sound, light or vibration sensor. The sensor may also include a digital camera. Network-connected smart devices can also sense state changes such as the operation of buttons 205a or actuators 205b (e.g. the lever indicating the refrigerator door has been opened). Network-connected smart devices can contain transceiver 210 and one or more antennas 205, operable to transmit first signals 140 to a central controller 150, network gateway 155 or to other network-connected smart devices.

First signals 140 can contain sensor measurements indicative of an aspect of a person (e.g. motion, thermal, sound, humidity or vibration associated with a person). In some embodiments a first signal 140 can include a unique identifier, used to identify a network-connected smart device 120 relative to other wireless sensors in the system.

Exemplary first signals 140 include electrical, acoustic or optic signals. Transceiver 210 can be a short range wireless transceiver, a long range wireless transceiver (e.g. 3G or 4G transceiver) or a wired transceiver (e.g. Ethernet or internet-over-powerline). A short range wireless transceiver is considered to have an operable transmission range less than 400 meters. Exemplary short range electrical protocols include Z-wave, Zigbee, Bluetooth, Low-Energy Bluetooth (BLE), Wi-Fi, RFID. Examples of short range optical protocols include IEEE 802.15.7 and Infrared Data Association (IrDA). The transceiver 210 and signals generator can be embodied as one or more microchips for example the CC3000 Wi-Fi transceiver and application processor or CC2430 Bluetooth transceiver and application processor, both available from Texas Instruments of Santa Clara, Calif. The wireless transceiver 210 and signal generator 230 can perform one or more pairing operations operable to associate a network-connected smart device 120 with a specific central controller 150 or a specific network of devices. Examples of pairing operations include, responding to an advertising signal from a central controller, negotiating or transmitting a unique ID for a network-connected smart device (e.g. session ID associated with short range wireless messages), establishing a secure connection by agreeing on a message cypher with a central controller, announcing to a central controller the capabilities of a network-connected smart device (e.g. motion, vibration, orientation, sound, humidity, state and number of buttons) or announcing capabilities such as data rate or the model number identifying the specific type of network-connected smart device.

Network-connected smart devices 120 can contain a signal processor 240 coupled to sensors 200, buttons 205a or actuators 205b, to perform various degrees of processing on the raw sensor data. The overall function of the processor can be to highlight sensor or actuator readings indicative of the presence of a person in a region around the device and generate first data. The processor can function to remove background sensor readings, detect peak values, filter the data or otherwise process the sensor data. For example, acoustic sensor readings may be filtered to remove background noise, or sounds known not to indicate the presence of a person such as the hum of refrigerator motor or the rustling of trees. The signal processor may thereby function to produce first data which has enhanced or highlighted indication of occupancy in a region around the network-connected smart device. The processor may combine data from multiple sensors or employ complex pattern recognition algorithms and output first data indicative of occupancy of a region around the fixed sensor. The signal generator 230 can combine sensor data and a unique identifier using the wireless protocol 220 to generate first signals 140. The unique identifier can serve to identify the network-connected smart device and identify first signals 140 as coming from a particular network-connected smart device 120.

First signals 140 contain first data. Examples of first data include raw sensor values and values indicating occupancy probability (e.g. 0.9 or 90%). In some embodiments network-connected smart device 120 can segment the field of sensing into smaller regions and report occupancy data for each of these smaller regions. For example, a wireless camera can transmit raw images, compressed images or images processed to identify occupancy in specific smaller regions as first data. The region for which a network-connected smart device is operable to report occupancy can be identified at the time of installation. For example, a security system can be setup such that specific wireless sensors cover specific regions of a house (e.g. front hallway, master bedroom or kitchen). These regions can be identified to the central controller, thereby enabling first signals associated with a wireless sensor to be associated with a previously defined region (e.g. room, hallway, or portion of a room). In some embodiments network-connected smart devices may not identify the region in which they are operable to sense occupancy and instead the central controller can define regions based on processing first signals. For example, a central controller 150 can aggregate or process first data from a plurality of fixed wireless motion sensors 120 and identify relationships (e.g. correlated first data, sequential patterns, coincident first data or overlapping regions) and thereby identify regions associated with occupancy data from each network-connected smart device. Network-connected smart device 120 can include a signal requestor 250 operable to receive signals from other network-connected smart devices or a central controller and initiate the transmission of a first signal 140.

Mobile Wireless Devices

FIG. 1A illustrates two mobile wireless devices 130a and 130b. Mobile wireless device 130a is embodied as a smartphone and 130b is embodied as a tablet PC. Embodiments of the disclosure may be implemented with a wide variety of mobile devices with short range wireless transmitters or transceivers. The mobile wireless device can be e.g. a mobile phone, a tablet PC, a laptop computer, a smart watch, a wearable health monitor such as FitBit™, for FuelBand™ or a portable media player. The mobile wireless device may also be a wireless RFID tag.

Mobile devices (e.g. 130a and 130b) can be associated with a primary user. Examples of device-to-user association include a smartphone or a tablet PC assigned to an employee in an office, a smart watch or health monitor primarily worn by one person or a portable laptop computer used by one family member. In some cases one person may be the primary user of a device at one time e.g. in the morning, while another person may be the primary user at another time e.g. at night.

Figure 3:
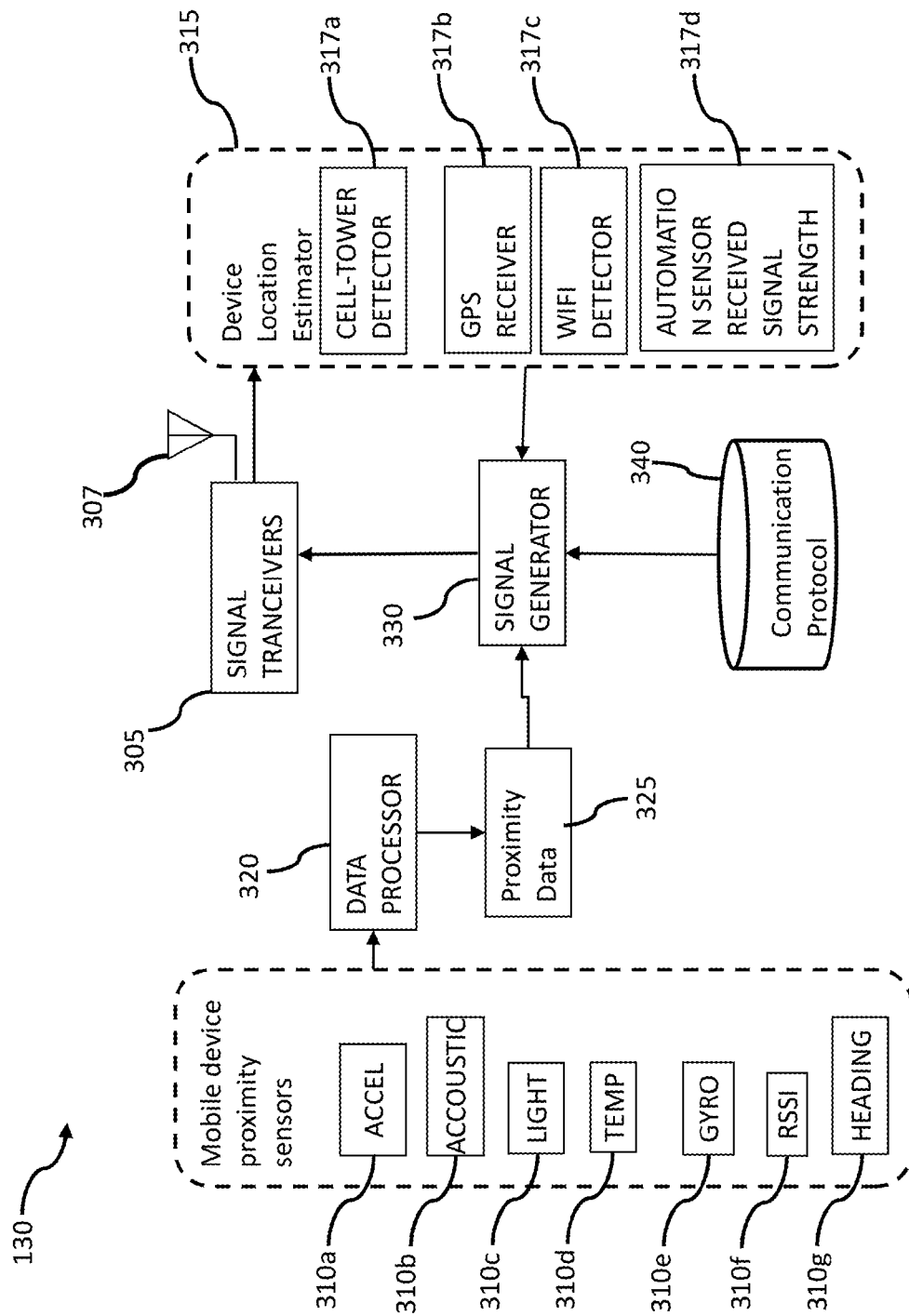
FIG. 3 illustrates an exemplary mobile wireless device in accordance with one embodiment of the present technology.

FIG. 3 illustrates an exemplary mobile wireless device in accordance with one embodiment of the present technology. The mobile device 130 can contain one or more wireless transceivers 305 operable to transmit second signals 185 to central controller 150. Mobile wireless device 130 can also include one or more antennas 307. Antenna 307 can be a chip type antenna, a wire or can be printed on a printed circuit board.

Mobile device 130 can include a device location estimator 315 that estimates a past or current location of mobile wireless device 130. Device location estimator can send data about the location of the mobile device to the signals generator 330. Device location estimator 315 can be implemented as one or more processors or one or more integrated circuited. Device location estimator 315 can be operable coupled to a variety of signals receivers operable to receive localization signals 165. Device location estimator 315 can perform various degrees of processing to estimate the mobile wireless device location. Localization signals 165 can be short range wireless signals (e.g. Wi-Fi, Bluetooth, Zigbee) or long range wireless signals (e.g. GPS, 3G/4G cellular signals). Analysis of localization signals 165 can indicate external transmitters (e.g. cellular towers or Wi-Fi hotspots) operable to provide the most accurate localization estimate. For example, the analysis can identify one or more Bluetooth beacons, network-connected smart devices 120, client devices e.g. 110, cell towers 170, GPS satellites 175 or Wi-Fi access points 180. Each external device can be associated with a known location, such that a location of the mobile device 130 can be estimated, e.g., via a triangulation or a trilateration technique.

Device location estimator 315 can process wireless signals received by the transceiver 305 or another receiver associated with the mobile device 130. For example, device location estimator can be operably coupled to a GPS receiver 317b that receives GPS signals identifying GPS satellites and can use received GPS signals to estimate mobile device location. In another example mobile device location estimator 315 can include a cell-tower detector 317a that detects which cell tower or cell towers are carrying cellular communications associated with mobile device 130. In another example, mobile device location estimator 315 can include a Wi-Fi detector 317c that detects nearby Wi-Fi transmitters. The transceiver 305 can be operable to receive first signals from the network-connected smart devices 120. The mobile device location can be calculated based in part on an aspect of the first signal 140 e.g. received signal strength, time delay between sensing and receiving the signal or the bit error rate of the first signal 140. Device location estimator 315 can perform various degrees of computation including estimating distance from a mobile wireless device 130 to network-connected smart devices 120, position triangulation and position trilateration. Device location estimator 315 can use third signals 190 or other signals from the central controller to estimate the location of the mobile device (e.g. within a range of 10 meters of the central controller) Device location estimator 315 can generate and transmit mobile device location data to a signal generator 330. Mobile device location data can be one or more aspects of localization signals 165, for example received signals strength, or the order of signals received (e.g. time of flight used by GPS systems). Mobile device location data can indicate the result of a calculation by device location estimator 315 indicating the estimated distance from the mobile device to one or more reference points (e.g. 10 meters from the central controller). A mobile devices or central controller can have a plurality of antennas operable to transmit independently or in combination (e.g. a MIMO antenna array). For example, mobile device location data can be an indication of the antenna receiving a localization signal 165 or third signals 190 with greatest signals strength. Mobile device location data can include an indication of the direction of the mobile device relative to a reference location (e.g. location data can indicate the mobile device is southwest of the central controller).

Mobile device 130 can transmit second signals 185 containing a mobile device location indication and a person-to-device proximity indication (e.g. proximity data 325). Proximity data 325 can be gathered from a wide variety of proximity sensors 310, can be processed by a data processor 320 to further highlight proximity indications and can be integrated into second signals 185 by signals generator 330.

For the purpose of this disclosure person proximity indications measured by a mobile wireless device 130 can be considered as sensor data indicative of the presence of a person in the vicinity of the mobile wireless device. Examples of proximity include devices attached to a person or placed close by a person, such as on a work desk, nightstand, kitchen counter, coffee table or car seat. Proximity can be indicated by the mobile device sensing acoustic signals, later determined to by typing, snoring or moving about a room. Further examples of proximity include being held during user-input, being carried in a person's hand, pocket, purse, backpack, or briefcase. In general, a mobile wireless device 130 can be considered to be proximal to a person when one or more sensors on the mobile device are able to sense the presence of the person. Proximity between a mobile wireless device and a person can also be indicated by variations in signal strength of signals 185 transmitted from a mobile device 130 to the central controller 150.

The proximity between a person and a mobile device can have a wide variety of values. For example, a person engaged in direct user interaction with a mobile device (e.g. typing or touching a screen) can indicate direct proximity. Direct proximity can indicate that a person is within reach of the wireless device (e.g. 1M). Other examples of direct proximity are vibrations indicative of walking with the mobile device in a pocket or purse, heartbeat measured by a mobile fitness tracker and small variations in the angle of inclination of a tablet PC indicating that a user is reading from the screen.

The mobile device 130 can also contain a wide variety of sensors 310a-g capable of sensing direct proximity as well as longer range indirect proximity (e.g. a tablet PC with a microphone that can hear a person talking in the background). For example, mobile device sensors may include an accelerometer, microphone, gyroscope, magnetometer (digital compass), barometer, humidity sensor, altimeter or camera. Other examples include sensors capable of measuring temperature and light level in the vicinity of the device. The function of the sensors 310a-g is to provide data indicative of the state of the device and indicative of proximity of one or more people. Examples of data indicative of device state include, angular orientation of the mobile device relative to the ground, direction the device is pointing (e.g., 330 deg NW.), vibration, acceleration and power state (e.g. active, standby or sleep). Examples of data indicative of person proximity include sound measurements (e.g. hearing someone rustle a newspaper), vibration (e.g. associated with typing on a keyboard), acceleration (e.g. consistent with a person walking) or changes in received wireless signal quality (e.g. received signal strength indication (RSSI) or bit-error-rate). For example, changes in signal quality can be indicative of a person momentarily blocking or shadowing a transmitting source.

The mobile device 130 can contain a data processor 320 coupled to the sensors 310a-g to perform various degrees of processing on the raw sensor data. The function of the processor 320 can be to highlight important sensor data while reducing the total amount of sensor data transmitted by the device. The processor can function to remove background sensor readings, detect peak values, filter the data or otherwise process the sensor data. For example, the acoustic sensor readings may be filtered to remove white noise, or sounds known not to indicate the proximity of a person such as the hum of refrigerator motor or the rustling of trees. The signal processor may thereby function to produce output data which has enhanced or highlighted indication of person to device proximity. The processor may combine data from multiple sensors and output an aggregated indication of person proximity. In one example processor 320 can be a digital signals processor operable to process a large number of sound samples (e.g. 44100 per second), remove high volume background noise (e.g. cars or machinery) and highlight indications of speech indicative of the proximity of a person.

The signal generator 330 functions to combine the proximity data 325 from the data processor 320 with location data from the location estimator 315. The signal generator can use a communication protocol 340 to form one or more second signals 185 which are transmitted by the short range transceiver 305. In one embodiment the transmitter and receiver use the same short range wireless protocol. In other embodiments these could be different protocols. For example, the wireless device may receive Bluetooth signals from nodes and transmit Wi-Fi signals including the mobile device location data and proximity data.

Figure 4:
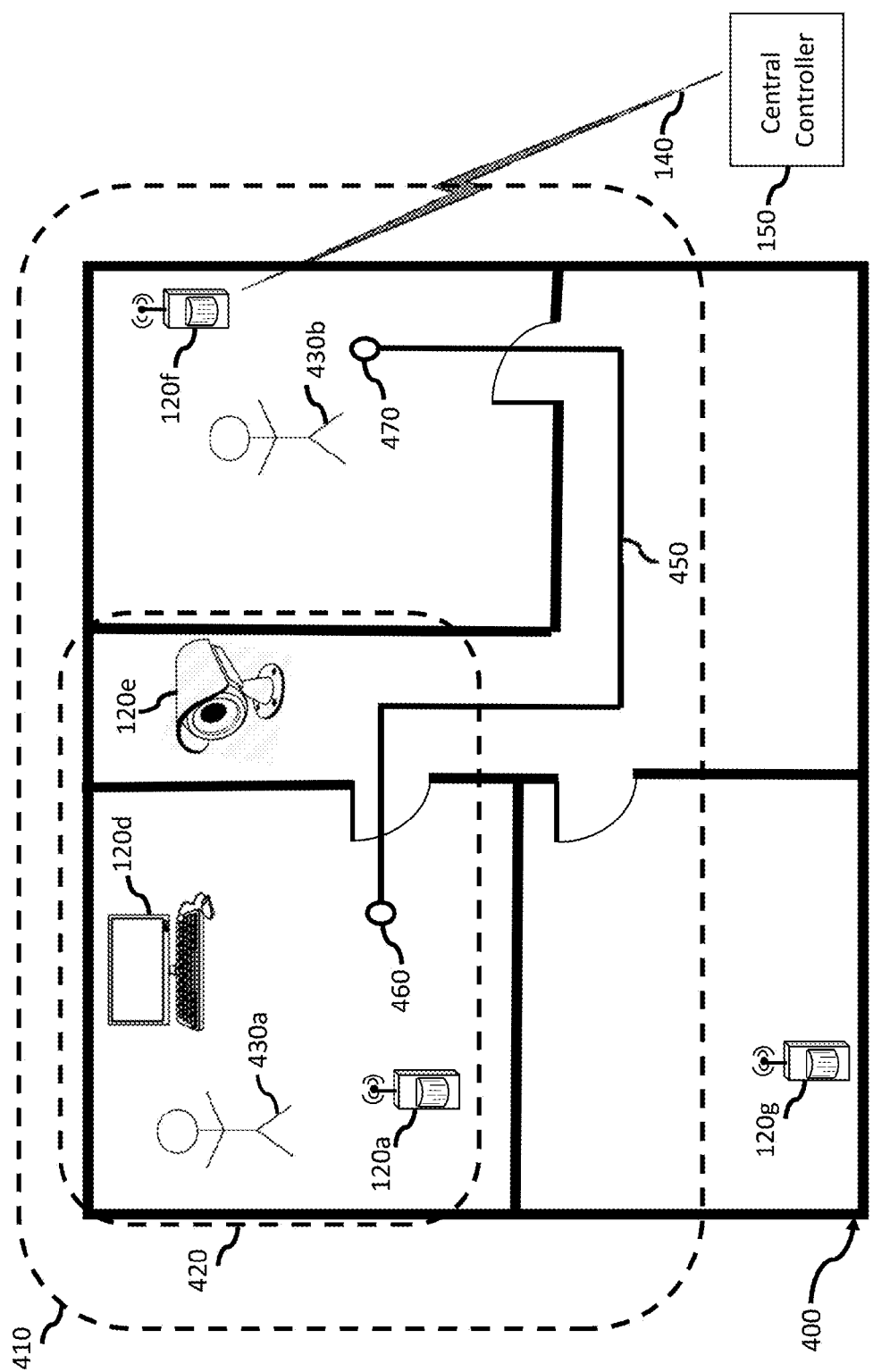
FIG. 4 is an exemplary diagram of an indoor area from which a central controller receives signals from a plurality of building-based devices, according to an embodiment of the present invention.

FIG. 4 is an exemplary diagram of an enclosed space from which a central controller receives signals from a plurality of network-connected smart devices, according to an embodiment of the present invention. An enclosed space (e.g. building 400) can be surrounded by an enclosing perimeter (e.g. walls or the hull of a ship) and can encompass a network of devices (e.g. 120a, 120b 120e, 120e, 120f and 120h). A plurality of devices can form a subset of the network of devices (e.g. 120a, 120b, 120e and 2100. The plurality of devices can sense occupancy in a region (e.g. 410) of the enclosed space 400. In some cases the plurality of devices can include all the devices in the network and can collectively sense occupancy in the entire enclosed space.

In one aspect this disclosure shows how to construct, configure and operate a central controller 150 operable to identify subsets of a plurality of devices such that there is at most one occupant in each subset. An estimate of the number of occupants in a region (e.g. 410) can be made based on the number of subsets required to account for all of the devices in the plurality. Some of the devices (120a and 120f) can be separated by a distance 450, that an occupant must traverse in order to be sensed by both devices. In some embodiments the time interval between sensing a person at a first device 120a and a second device 120f can be measured and an estimate of the distance 450 can be calculated. For example, point 460 can represent the last point operable to be sensed by 120a and point 470 can represent the first point operable to be sensed by device 120f. The distance between these two points (e.g. 450) can be estimated based on the transition time between sequential device activations of 120a and 120f. The path length 450 can be estimated based on the average walking speed of a person. The path 450 can include one or more intermediate devices, e.g. IP camera 120e in a hallway. Therefore a single occupant 430a would be observed by the intermediate sensors 120e when travelling between points A and B along path 450.

Exemplary Central Controller

Figure 5:
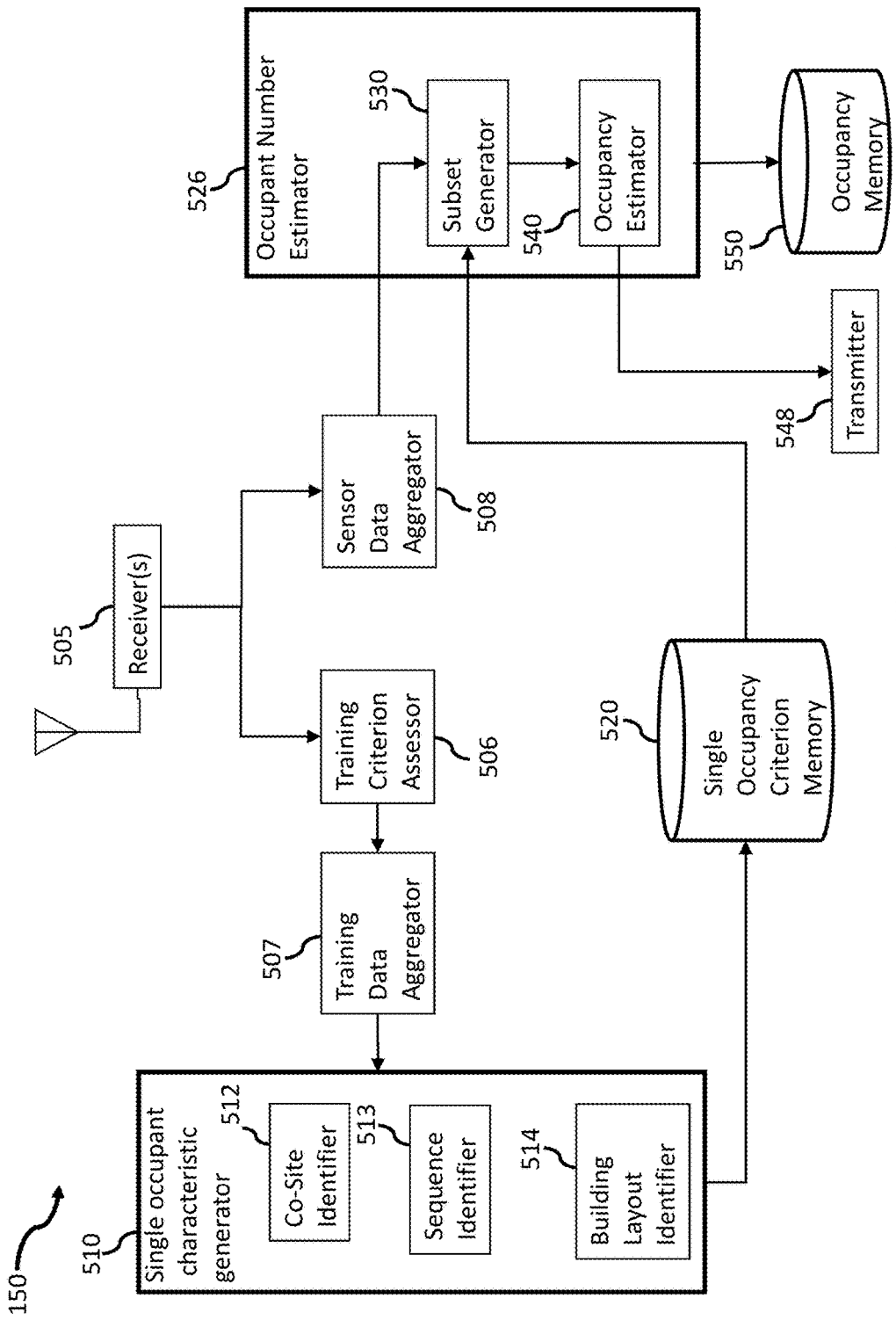
FIG. 5 illustrates a functional diagram showing an exemplary central controller according to an embodiment of the present invention.

FIG. 5 illustrates a functional diagram of an exemplary central controller according to an embodiment of the present invention. The central controller 150 can perform two main functions: characterization of the enclosed space in terms of single occupant characteristics and applying the single occupant characteristics to sensor data, thereby estimating the number of people in a defined region of the enclosed space. In some embodiments central controller 150 can be located within the enclosed space 400. For example, central controller 150 could be embodied as a network access point (e.g. set top cable box, internet gateway) or a smart home hub.

Central controller 150 can contain one or more receiver 505 operable to receive smart device signals from devices (e.g. 120a and 130a in FIG. 1A) in the enclosed space 400. Smart device signals can be first signals 140 or second signals 185 and can contain sensor data. In some embodiments receiver 505 is part of a transceiver that is also capable of transmitting signals. Receiver 505 can include suitable hardware for performing device discovery, connection establishment, and communication necessary to receive first signals 140 and second signals 185. Receiver 505 can be configured to operate with a variety of short range wireless transmission protocols e.g. Z-wave, Zigbee, Bluetooth, Low-Energy Bluetooth (BLE), Wi-Fi, RFID and IrDA. Exemplary wireless signals include electrical, acoustic or optic signals. It should also be understood that several other short-range receivers can be used that do not utilize any standardized wireless protocols (e.g., car keyfobs). Receiver 505 can be a single microchip transceiver operable to receive smart device signals, demodulate signals, identify data packets and transmit some or all of the data in a packet to other components (e.g. processors, memory devices) within the central controller, using a transmission protocol e.g. (I2C, UART, Ethernet or I2S). Smart device signals such as first signals 140 and second signals 185 can be received using different receivers and different short range transmission protocols for example first signals can be Z-wave packets and second signals can be low energy Bluetooth packets. Sensor data in smart device signals (e.g. 140 and 185) can be aspects of signals quality (e.g. RSSI, signal to noise ratio, time of flight and bit error rate). Receiver 505 can be operable to measure one or more quality aspects of the received signals (e.g. RSSI, signal to noise ratio, time of flight and bit error rate), convert these indications to signal quality data and transmit these to other components within the central controller 150 along with packet contents. A local central controller 150 can further receive signals from devices using a variety of custom or standard wired protocols (Homeplug®, USB, CAT6 Ethernet, I2C etc.).

In some embodiments smart device signals 140 and 185 can be aggregated at a network access point within the enclosed space 400 (e.g. a wireless access point or Zigbee wireless bridge) The network of devices can be operably connected to transmit first and second signals containing sensor data and training data to a remotely located central controller 150 through one or more network access points (e.g. using router 155 and a connection to the world wide web 160). The central controller 150 can be remotely located and can service many buildings at once. In such embodiments receiver 505 can be a fiber optic transceiver, or Ethernet transceiver or other long data packet transceiver. In some embodiments signals from devices in the network are first sent to a web server (e.g. a server hosted by the device manufacturer). Later raw or processed sensors data can be transmitted from the web server to the central controller. This type of cloud-cloud data transfer is common where device manufacturers wish to control access to data associated with devices they sell and make the data available to partners following aggregation at the web server.

Central controller 150 can contain a training criterion assessor 506, which functions to determine periods of time when the central controller should gather training data. For example, the training criterion assessor can hold a criterion that indicates when no people are present in the enclosed space. This criterion can then be used to gather training data indicative of baseline non-human sensor data levels (e.g. the impact of a HVAC system on sound and motion sensors). The training criterion assessor can access or store a plurality of rules indicating when training data should be gathered. For example, a rule can be stored in the training criterion assessor indicating that background data should be gathered if no smartphones are detected in the network of devices and the time is between 10:00 am and 12:00 pm. In a smart office building a training criterion can state that background sensor data should be gathered if the time is before 7:00 am or after 9:00 pm and there has been no indication of presence in the previous 20 minutes.

In another aspect, the training criterion assessor 506 can evaluate incoming sensor data relative to one or more training criteria to identify when one person occupies the enclosed space or a region of the enclosed space. Such training data is invaluable because over time it establishes a dataset that can be mined and processed to establish the bounds of single occupant capabilities within the variable space established by the network of devices. Characterization of the enclosed space is improved by determining that a portion of training data corresponds to circumstances when one and only one person occupies the enclosed space. Training criteria indicating single occupancy can be conservative and require confirmation by additional criteria in order to ensure that only a single person is in the enclosed space. For example, a training criterion can state that in order for training to begin only a single smartphone must be registered on the wireless LAN, cars associated with other occupants must be absent from an IP camera observing the driveway and no sensor data indicative of multiple occupants must have occurred in the previous 20 minutes. Training criteria used to determine when a single person is in the enclosed space can include badge-reader data, confirmation that other family members are elsewhere (e.g. cell tower indications) and historical occupancy patterns. The training criterion assessor can initiate background data gathering when a zero occupant training criterion is met and initiate gathering of training data when single occupant training criteria are met. In one embodiment the training criterion assessor does not have to perform realtime processing and can sample the incoming data in first and second signals to generate an increasing measure of confidence that eventually satisfied the training criteria for zero or one occupant.

Central controller 150 can contain a training data aggregator 507 that functions to aggregate training data or background data upon satisfaction of a training criterion. Training data can be sensor data gathered from smart device signals (140 or 185) upon satisfaction of a training criterion. The function of the training data aggregator 507 can be to provide sufficient data and highlight important training data for subsequent processing by the single occupant characteristic generator 510. For example, in one embodiment, training data aggregator 507 can inspect incoming training data for indication of activity, occupancy or large changes in occupancy sensed by one or more device in the enclosed space (e.g. 400). Upon satisfaction of a training criterion indicating zero people in the enclosed space or a region of the enclosed space background data can be stored in a first hash table at 507. Upon satisfaction if a training criterion indicating one person in the enclosed space or a region of the enclosed space background data can be stored in a second hash table at 507. Each hash table in the training data aggregator can store the frequency of occurrence of each training data vector.

Central controller 150 can include a single occupant characteristic generator 510. The function of the single occupant characteristic generator 510 is to process the aggregated training data and determine single occupant characteristics indicative of the range or bounds of training data that can be accounted for by a single occupant. The performance of occupant number estimator 526 depends in large part on developing accurate and detailed single occupant characteristics. For example, an IP camera and a motion sensor may simultaneously sense the presence of a person when a single occupant training criterion is satisfied. Occupancy characteristic generator 510 can initially generate a simple single occupant characteristic stating that simultaneous activation of the motion sensor and IP camera can be accounted for by a single occupant. In one aspect the characteristic can be improved and refined using subsequent training data to identify the exact regions of the camera field of view correlate with motion sensor data of a particular magnitude when a single occupant is present. Hence more detailed characteristics can be generated delineating the boundaries the variable space that can be occupied by a single occupant. Single occupant characteristic generator 510 can include a processor dedicated to generating rules and storing rules in a memory device. Single occupant characteristic generator 510 can also be a routine stored in a non-transitory computer readable storage medium that is executing on a processor.

Single occupant characteristic generator 510 can include a co-site identifier 512 for generating single occupant characteristics based on identifying groups of devices that can simultaneously report the presence of a person. In the context of the present disclosure a concurrent characteristic is a single occupant characteristic that indicates a boundary of simultaneous sensor data that can be explained by a single person. For example, a concurrent characteristic can identify a group of devices that can concurrently report presence, or a concurrent characteristic can identify a group of devices that cannot concurrently report presence. For example, in a four device network (D1-D4) an exemplary concurrent single occupant characteristic can state "(D1 and D4)" meaning that device when D1 and device D4 can concurrently report sensor data indicative of the presence of a person. It is interesting to note that the exemplary concurrent characteristic does not make reference to device D2 or device D3. A person skilled in the art of Boolean logic can recognize that an unreferenced variable can take any value without changing the outcome of a logical expression. In several embodiments it can be assumed that not referencing a variable in a single occupant characteristic indicates that the characteristic should hold true for any combination of unreferenced variables. Hence the exemplary concurrent characteristic "(D1 and D4)" can account for fours sensor data vectors corresponding to the four possible combinations of D2 and D3. Hence the exemplary single occupant characteristic "(D1 and D4)" indicates concurrent device behavior operable to be accounted for by a single occupant and defines a boundary in the variable space separating the 2-D plane formed by the four combinations of D2 and D3 when D1=1 and D4=1 from similar 2-D planes with other combinations of D1 and D4. Similarly a single occupant characteristic can be generated at 510 stating that two or more sensors do not have the property of co-site (e.g. cannot concurrently report the presence of a person). In this case the single occupant characteristic could state that two or more first devices cannot be simultaneously activated. Devices such as cameras can provide a large quantity (e.g. megabytes) of raw data to a co-site identifier. Hence the job of the co-site identifier can be to identify ranges of training data (e.g. sectors of a field of view or ranges of sound or motion data) that can simultaneously be attributed to a single person.

Today several companies offer monitored Web camera services (e.g. centralized storage and processing of camera image data). In one aspect the co-site identifier can perform digital image processing of camera images, identify indication of person presence in some or all of the image, identify concurrent sensor data from other devices and generate single occupant characteristics (concurrent characteristics) based on the observed correlations between devices (e.g. IP camera and motion sensor correlation). In one embodiment the training data aggregator 507 gathers several training images from an IP camera 120*e* or similar type of digital image capture device. Training data aggregator 507 simultaneously records sensor data from a plurality of other devices in an enclosed space. The images can comprise a plurality of pixels, with the pixels in each image representing a multi-dimensional training data vector. These vectors can be augmented with the concurrent data from the other devices in the network. For example, a 400×600 pixel image can be augmented with 10 binary values from motion sensors to generate training data vectors with 240010 dimensions. Co-site identifier 512 can process the vectors holding the combined image and device data with a pattern recognition algorithm designed to recognition patterns (e.g. people or cars) within images. In this way existing pattern recognition algorithm for digital images can be extended to augmented image data. Single occupant characteristics (e.g. concurrent characteristics) can be generated form the results of the image processing. Another approach to generating concurrent characteristics associated with the bounds of capabilities of a single person in a network is to identify logical groups of dimensions (e.g. devices or sensors within a device) wherein the property of single occupancy is invariant (e.g. all entries corresponding to device in the hash table produce non-zero frequencies).

Single occupant characteristic generator 510 can include a sequence identifier 513 for identifying sequences of presence detection by devices that can be attributed to a single person. In the context of the present disclosure a sequential characteristic is a single occupant characteristic that indicates a boundary of sequential sensor data that can be explained by a single person. A single occupant characteristic can be generated in part based on sequences of devices that cannot be accounted for by a single occupant. For example, sequence identifier 513 can observe the sequence of person detection by a plurality of motion detectors in a building. Based on observations over a period of time (e.g. days or months) sequence estimator 513 can estimate that motion detector 1 in a conference room and motion detector 3 in a nearby office cannot be sequentially activated by a single occupant without the intermediate step of activating motion detector 2 in the interconnecting hallway. Single occupant characteristic generator 510 can generate a single occupant characteristic based on the estimated sequence for a single occupant from the sequence estimator 513.

Characteristic generator 510 can include a floorplan estimator 514 operable to estimate the minimum transition time associated between when a single occupant can be sensed by a pair of devices. The floorplan estimator can use observed sequences of training data and average walking speeds to estimate the spatial separation (e.g. distance 450) between pairs of devices (e.g. 120*a* and 120*f*). Upon satisfaction of a training criterion indicating that only a single occupant is in at least a region of the enclosed space (e.g. 400) a single occupant characteristic can be generated based in part on the observed transition times between device pairs. For example, single occupant characteristic generator 510 can use floorplan generator 514 to determine that two sensors are located at opposite ends of the building and estimate the spatial separation (e.g. 10 m or 100 m). The spatial separation of two or more first devices may be used to generate a single occupant characteristic. In another example a desktop computer and a building entry card-reader can be part of a network of devices transmitting first signals 140 to central controller 150. Training data aggregator 510 can gather data regarding the time elapsed between a person swiping their card and the person beginning to type on the keyboard in their office. Floorplan estimator 514 can access the aggregated training data (e.g. over several weeks or months) and generate a single occupant characteristic based on a measure of the minimum transition time observed for a single occupant. The person could always take much longer than the minimum transition time (e.g. stopping for coffee first) but a single occupant is unlikely to traverse the distance in significantly less than the minimum time. For example, a single occupant characteristic may identify that the minimum transition time for a single occupant to swipe a badge at one first device and start typing at a computer is 25 seconds. Subsequent sensor data indicating sequential activation of the card reader and desktop PC within 10 seconds would be counter-indicative of a single occupant.

Single occupant characteristic generator 510 can be operably connected to store the generated single occupant characteristics in a single occupancy criterion memory 520. The function of the single occupancy criterion memory is to store the characteristics in a location and form accessible by the occupant number estimator. Single occupancy criterion memory 520 can be a non-volatile memory storage device (e.g. DVD, CD-ROM, SRAM or FLASH memory) or a portion of a hard disk. The single occupancy criterion memory 520 can be volatile memory associated with a processor. The single occupancy criterion can be a set of rules (characteristics) which when satisfied by sensor data corresponding to a subset of devices in the network indicate that the first data can be satisfied by a single occupant. As such the single occupancy criterion can be implemented as a sequence of logic gates (e.g. an FPGA). A hardware implementation of single occupancy criterion 520 can enable many single occupant characteristics to be evaluated at once. In one embodiment the single occupancy criterion 520 is a reconfigurable piece of hardware that is periodically updated with a new version of the single occupancy criterion for the enclosed space.

Central controller 150 can include an occupant number estimator 526 that functions to periodically or continuously estimate the number of people in one or more regions of the enclosed space containing a plurality of devices. Occupant number generator 526 can receive data from a sensor data aggregator 506. Sensor data aggregator 506 can be similar in structure and function to the training data aggregator 507. However sensor data aggregator can gather data in circumstances with a plurality of occupants.

Occupant number generator 526 can include a device subset generator 530 for generating subsets of devices wherein all sensor data for all devices in a subset satisfies the single occupancy criterion (stored in 520) for that subset of devices. In one embodiment the subset generator can identify a plurality of devices from within the network of devices and can identify a candidate device from within the plurality of devices. The subset generator can try to grow an existing subset in which all data satisfies the SOC by adding the sensor data from the candidate device and revaluating the SOC. In this way the subset generator 526 can grow a subset by adding a candidate device if the proposed grouping will still satisfy the SOC and generating a new subset if no grouping of an existing subset with the candidate continues to satisfy the SOC. For example, consider an office building with two floors and one person on each floor. Subset generator 530 can function to identify subsets of devices (e.g. motion sensors) that satisfy the single occupancy criterion. In this example, the single occupant criterion generated in the described manner would form the basis to preclude the subset generator 526 from forming a single subset including all devices on both floors. In this example subset generator 530 would need to form two subsets of the devices in order to account for each device in a subset that satisfies the SOC.

Occupant number generator 526 can include an occupancy estimator 540. Occupancy estimator 540 receives the number of subsets of devices that satisfy the single occupancy criterion from the subset generator 530. Occupancy estimator 540 generates a prediction of the number of people in the region containing the plurality of devices. Occupancy estimator 540 can estimate the number of occupants based on the number of subsets. Central controller 150 can include an occupancy memory 550. The occupancy memory can store one or more previous predictions of the number of occupants from the occupancy estimator 540.

Central controller 150 can contain one or more transmitters 548 operable to send one or more third signals 165 to one or more client devices 110. Transmitter 548 can be part of a transceiver along with receiver 505. Transmitter 548 can transmit instruction in signals 165 based on the estimated number of people in a region (e.g. 410). Exemplary client devices. Transmitter 548 can be a wireless transmitter (e.g. Wi-Fi, 4G, Bluetooth, Zigbee, Z-wave) or transmitter 548 can transmit third signals 165 over a wired interface to automation devices. Examples of wired transmission protocols include Ethernet, Ethernet over powerline, Homeplug® AV, USB. Transmitter 548 can use a variety of wired and wireless protocols to distribute audio or video streams to speakers and displays located throughout the building Transmitter 548 can be indirectly coupled to automated client devices e.g. 110 using a data transmission network. For example, third signal generator 442 can generate web traffic such as Transmission Control Protocol/Internet Protocol (TCP/IP) or User Datagram Protocol (UDP) packets intended for a client devices e.g. 110 and transmit these packets to a server on the World Wide Web. The server can be operably coupled to the third device and can subsequently transmit the packet to the third device. This type of server-relayed third device signaling has advantages in terms of signal reliability and storing copies of third signals.

The central controller 150 can perform two main functions: characterization of the enclosed space in terms of single occupant characteristics and applying the single occupant characteristics to sensor data, thereby estimating the number of people in a defined region of the enclosed space. It can be beneficial to geographically separate the two functions of single occupant characteristic generation and occupant number estimation (i.e. characteristic application). For example, the components of the central controller 150 for gathering training data and generating single occupant characteristics (e.g. 507 and 510) could be remotely located from components of the central controller that store the single occupancy criterion and apply the criterion to generate single occupant subsets (e.g. 520 and 526). A remotely located single occupant characteristic generator 510 can generate characteristics for multiple buildings and apply centralized learning from similar buildings (e.g. commonly experienced concurrent data in hallways, conference rooms and stairwells). Training data aggregation can involve generating and storing a large hash table of training data vectors. Similarly, the process of generating single occupant characteristics can involve pattern recognition and understanding of the capabilities of a particular type or model of device (e.g. a specific brand or model of motion sensor). These large datasets and cross instance learning can make centralized processing of training data to identify single occupant characteristics beneficial. In some embodiments a remote computing facility can house the training data aggregator 507 and single occupant characteristic generator 510 and compute characteristics for a plurality of buildings and networks of devices. For example, an internet service provider, television provider or remote security monitoring company could provide specialized computing hardware configured to recognize patterns in training data as a remotely computing part of the central controller 150 for several buildings. The pattern recognizing hardware can include one or more multi-core computer processor operable to perform parallel processing of training data. A shared single occupant characteristic generator 510 can also benefit from employing an artificial neural network (ANN). For example, artificial neural networks are particularly suited to classification and pattern recognition tasks. An artificial neural network can be trained on several networks of devices (e.g. a security companies preferred self-installation device and sensor suite), and subsequently recognize familiar patterns within training data from customers buildings. The ANN can generate single occupant characteristics based on accumulated learning. A shared single occupant characteristic generator 510 can share information about single occupant characteristics identified in similar building (e.g. buildings with a similar floorplan, in the same neighborhood, or where a service provider has installed a similar network of devices).

It can be beneficial to storing and apply the single occupant characteristic close to the enclosed space (e.g. 400). For example, storing the single occupancy criterion 520 and occupant number estimator 526 close to the network of devices, can improve latency and ensure continuity of service if the network connect is lost to the remote located components. Hence, one cost effective embodiment of the central controller 150 includes remotely located building characterization components (e.g. 507 and 510) and locally computing the number of people and controlling client devices.

Operation

Figure 6:
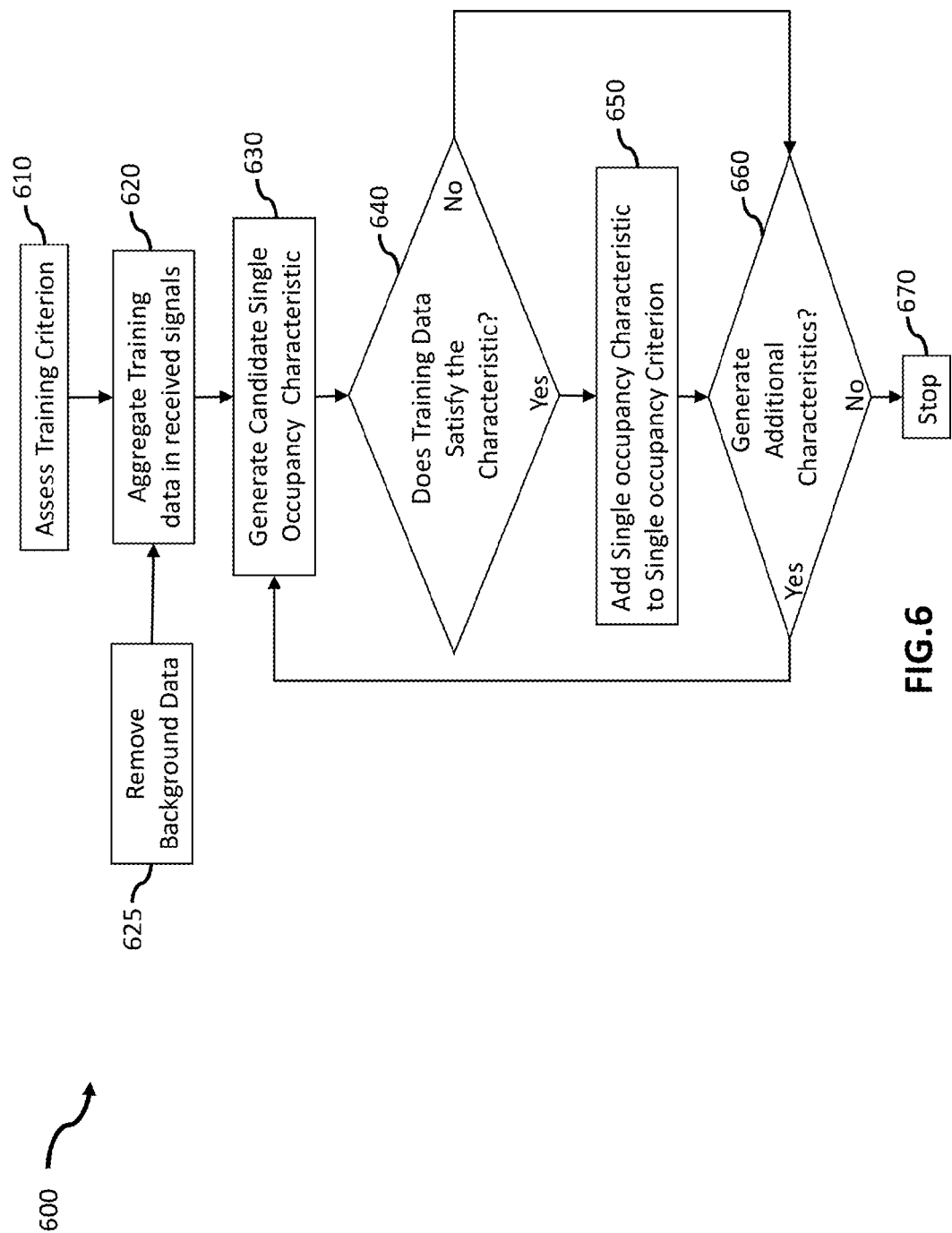
FIG. 6 is a flow diagram of a method for generating a number of single occupant characteristics associated with a network of devices.

FIG. 6 is a flow diagram of a method 600 for generating a number of single occupant characteristics associated with an enclosed space or a network of devices. Method 600 can be implemented by a central controller 150. Method 600 can also be implemented by one or more computers connected to a network of devices by a local area network or wide area network (e.g. the World Wide Web). Method 600 identifies opportunities when a computer can characterize an enclosed space with an associated network of devices (e.g. when there is a single occupant). Method 600 further describes how to characterize the enclosed space in terms the boundaries of sensor data that can be accounted for by a single occupant.

The method further stores the characterization as a single occupancy criterion, comprising the plurality of single occupant characteristics.

At block 610 data operable to indicate the occupancy of an enclosed space can be obtained (e.g. active mobile wireless devices, sensor data from devices in the network or an away-time or single-occupant flag established by a user). At block 610 the data is assessed relative to a training criterion. Criteria can indicate when the network is unoccupied or occupied by a single occupant. The data upon which the training criterion is assessed can be from a wide variety of data sources that can indicate the occupancy of the enclosed space and not just sensor data from devices in the network. Examples of data on which the training criterion can be assessed include (cell location record, indications that family members are elsewhere, such as at school or at work, data from a smart car to indicate it is elsewhere, or data from a badge reader to indicate a person is outside the enclosed space). Based on the training criteria method 600 can automatically assess when a single occupant is present and commence training (or no occupants for gathering background data). At block 620 training data can be aggregated from the first and or second signals. Training data can be stored in a hash table along with the frequency of occurrence for various combinations of data. At block 625 non-human background data can be removed from the training data. This can enhance indications of person presence.

At block 630 the training data is processed and a candidate single occupant characteristic is identified. The candidate characteristic can be a refinement to an existing characteristic or can be a new characteristic. The candidate rule can have a have a range of values that are refined in subsequent steps for example a candidate characteristic can state that: "a motion detector D1 in a conference room and a computer in an office are separated by a transition time of no less than 6 seconds when activated by a single person". The characteristic can be later refined to modify the 6 second value to 5 seconds. At block 640 some or all of the training data can be assessed relative to the candidate single occupant characteristic. If the training data fails to satisfy the characteristic, the characteristic is rejected, otherwise it is accepted. In one aspect method 600 benefits from the implicit assumption (based on block 610) that the training data can be accounted for by a single person. Therefore as the volume of training data increases the candidate characteristics are forced to become more refined (i.e. accurate) at differentiating between possible and impossible training data combinations with respect to a single occupant. At block 650 a single occupant characteristic that passes block 640 is added to a single occupancy criterion associated with the enclosed space. At block 660 the method decides if another candidate characteristic should be generated. If the answer is "no" method 600 ends at block 680. If the answer is "yes" method 600 returns to block 630 and generates an additional candidate characteristic.

In one embodiment a target number of characteristics can be established. For example, if the network contains 10 devices it can be appreciated that a characteristic indicating the transition time between any pair of these devices can be developed (even if the resulting transition time is zero indicating concurrent operation is possible). Hence method 600 can proceed until a target number of single occupant characteristics are reached (e.g. one characteristic for each possible combination of the 10 devices). In another embodiment method 600 can continue to generate and evaluate candidate single occupant characteristics until the SOC is satisfied for each non-zero frequency training data vector in the aggregated training data. In the context of the present disclosure the SOC is considered a complete SOC if the SOC is satisfied by each non-zero training data vector in the aggregated training data. In other words, for every combination of training data that is presently known to be possible by a single person in the enclosed space the SOC is satisfied (e.g. returns a TRUE result). It can be understood that while the SOC may be complete, with additional training data the single occupant characteristics within the SOC can be further refined, combined (to form a simpler characteristics) and deleted (e.g. a device is moved or replaced), in an effort to best delineate the boundaries of the variable space that a single occupant can accomplish.

Exemplary Occupant Counting Method

Figure 7A:
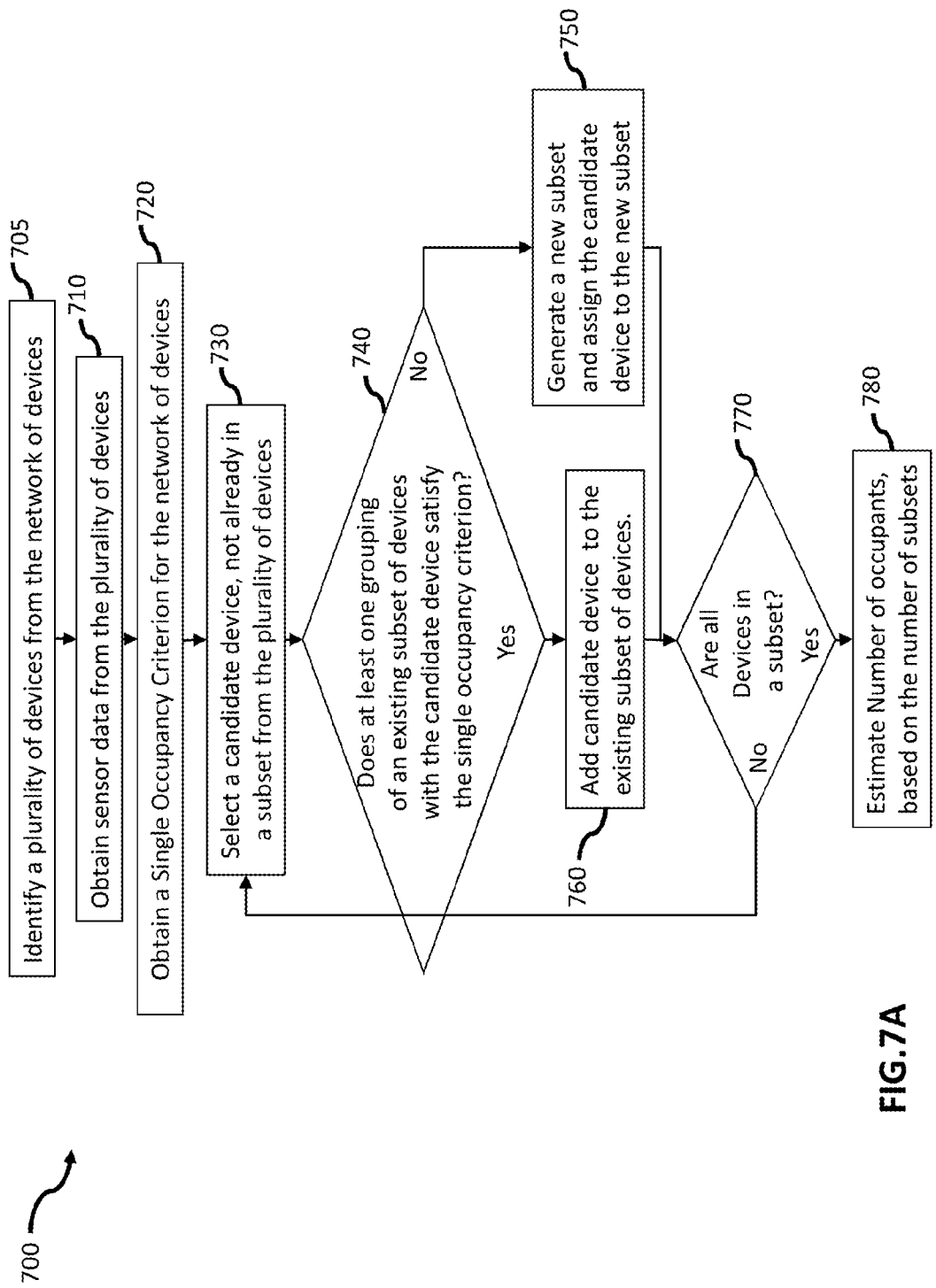
FIG. 7A is a flow diagram of a method for estimating the number of occupants in a region of an enclosed space in accordance with an embodiment of the present invention.

FIG. 7A is a flow diagram of an exemplary method 700 for estimating the number of people in an enclosed space. Method 700 can be implemented by a central controller 150. Method 700 can also be implemented by one or more computers connected to a network of devices by a local area network or wide area network (e.g. the World Wide Web). At block 705 a plurality of devices are identified. The plurality of devices is a subset of a network of devices for which a SOC has been generated. At block 710 the central controller 150 receives signals from the plurality of devices and obtains sensor data from the received signals. Signals can be first signals from network-connected smart devices or second signals from mobile wireless devices. Sensor data obtained at 710 can be aggregated by aggregator 507. At block 720 a single occupancy criterion (SOC) is obtained corresponding to the network of devices. In some embodiments the SOC need not correspond to the whole network but corresponds to at least the devices in the identified plurality of devices.

At block 730 a candidate device is selected from the plurality of devices. In one embodiment of method 700 the candidate device must not be in an existing subset with other devices thereby ensuring the method selects a previously unprocessed candidate device. At block 740 method 700 endeavors to add the candidate device to an existing subset of device that already satisfy the SOC. The candidate device is grouped with an existing subset. Method 700 then assess if the SOC can be satisfied by the sensor data corresponding to the grouping. It can be appreciated that data corresponding to a grouping cannot fail to satisfy the SOC based solely on data from a device outside the subset. Hence smaller subsets can have a greater probability of satisfying the SOC since many of the characteristics in the SOC can refer to devices outside the subset. If the grouping satisfied the SOC method 700 moves to block 760 and grows the satisfying subset by adding the candidate device. If the grouping does not satisfy the SOC, an alternative grouping is formed by the candidate device and another existing subset. If there exists no grouping (i.e. no existing subset) for which the SOC is satisfied, method 700 proceeds to block 750 and generates a new subset with the candidate device. At block 770 a determination is made whether all devices in the plurality of devices are in a subset. If the answer is "no" the method returns to block 730 and chooses another candidate device. If the answer is "yes" then at block 780 the number of people in the region corresponding to the plurality of devices is estimated based on the number of subsets necessary to complete occupancy test method 700.

Figure 7B:
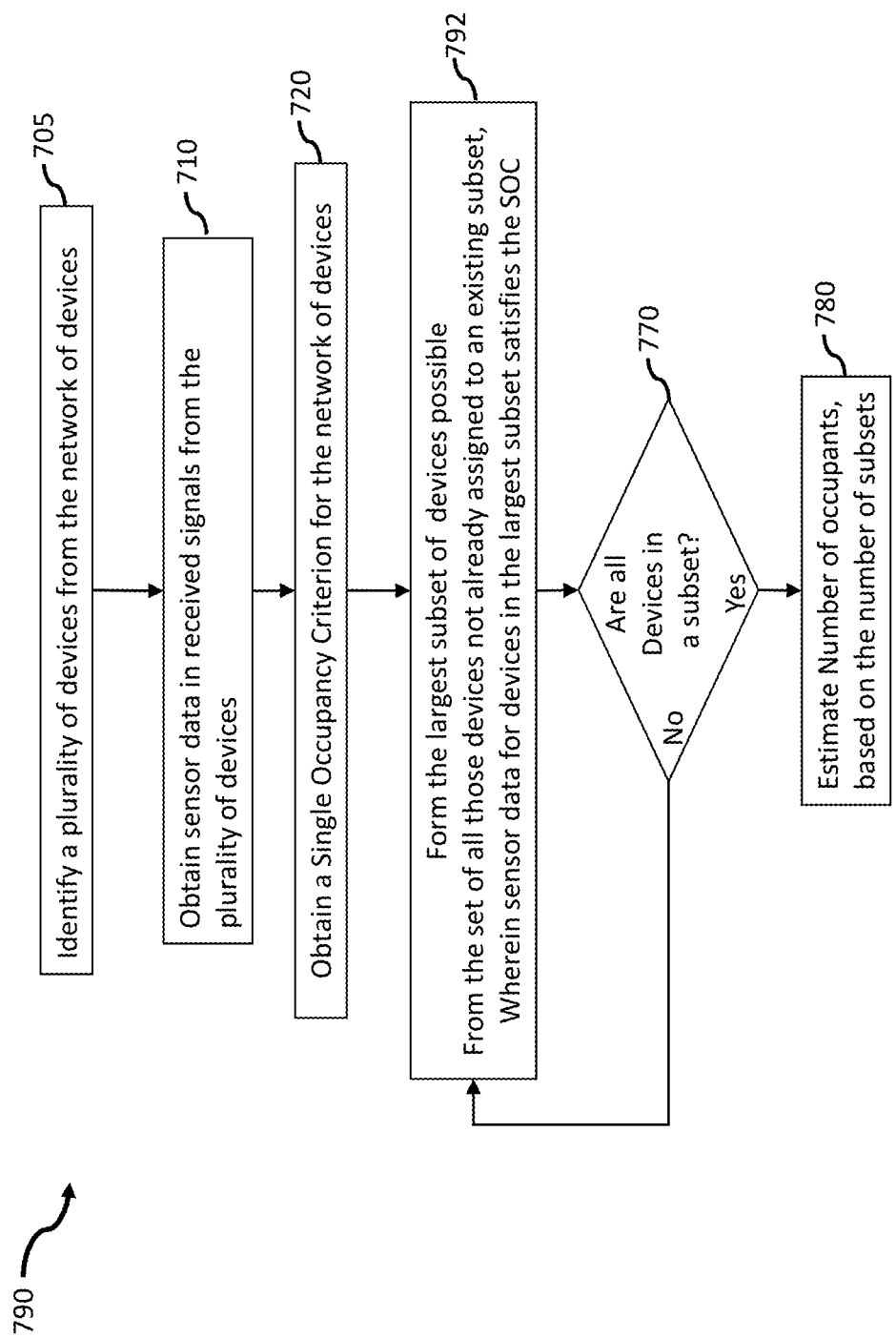
FIG. 7B is a flow diagram of a method for estimating the number of occupants in a region of an enclosed space in accordance with an embodiment of the present invention.

FIG. 7B is a flow diagram of an exemplary method 790 for estimating the number of people in an enclosed space. Method 790 is a variation of method 700. Method 790 replaces several steps in 700 with a step 792 that generates the largest possible set of previously unaccounted for devices from the plurality of devices, while satisfying the SOC by the sensor data corresponding to devices in the subset. Successive application of step 792 generates or identifies a set of subsets of devices with decreasing size. This approach helps to generate the minimum number of subsets in the set of subsets that satisfy the SOC. Hence method 790 can provide a smaller number of subsets and in many cases the smallest possible number of subset that can satisfy the SOC while accounting for all devices. Forming a subset of devices can involve placing the devices in a list and storing an entry corresponding to that list in a set of such entries. For in one embodiment each device in the plurality of devices can be assigned corresponding entry in an array stored in the computer implementing method 700 or 790. A subset can be represented by a list of array elements forming the subset. A pointer to the list can serve as a designator for the subset. The set of subsets can comprise an array of pointers, each pointing to a list of devices representing a subset of devices.

Figure 7C:
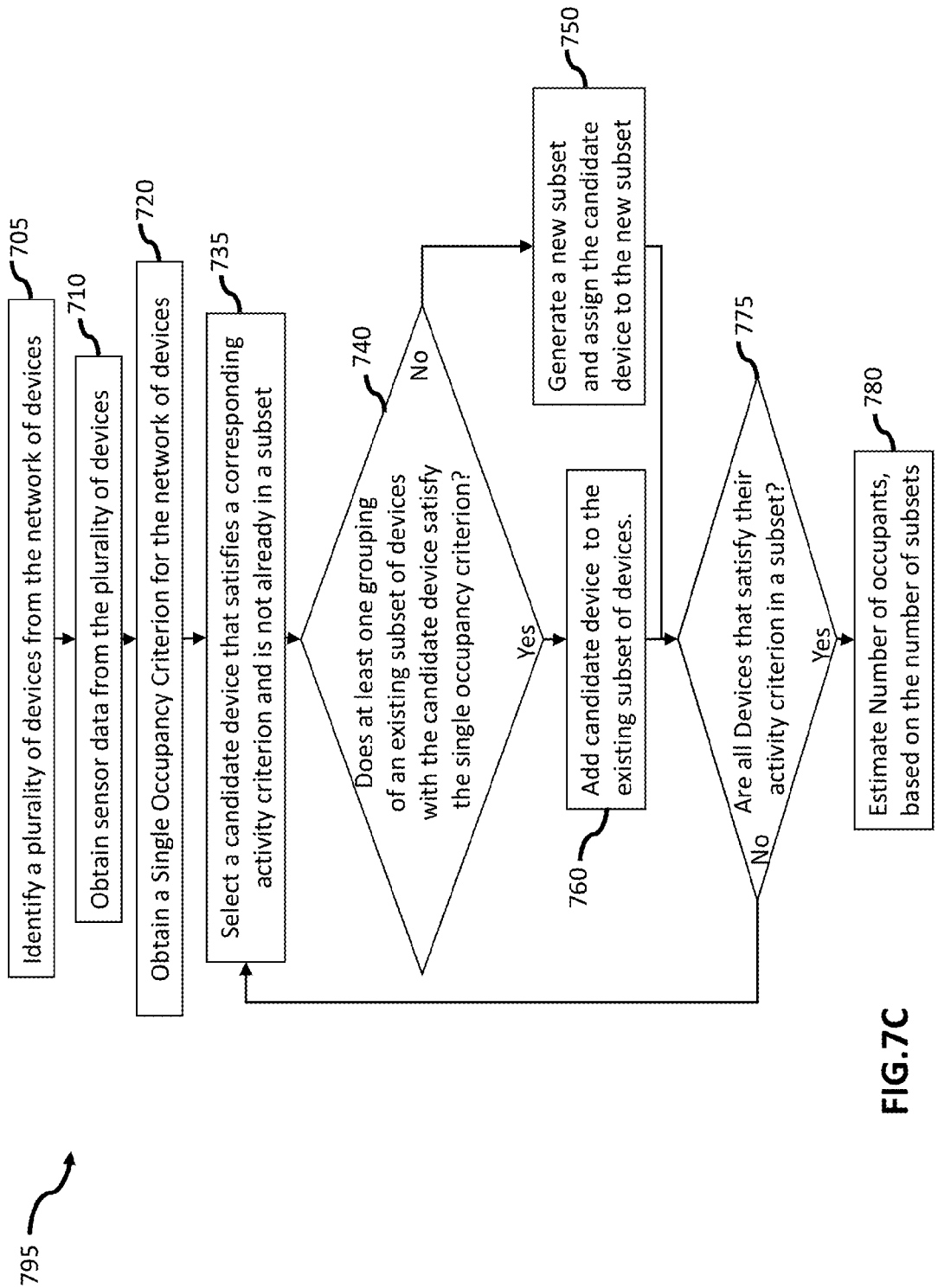
FIG. 7C is a flow diagram of a method for estimating the number of occupants in a region of an enclosed space in accordance with an embodiment of the present invention.

FIG. 7C is a flow diagram of an exemplary method 795 for estimating the number of people in an enclosed space. Method 795 is a variation of method 700. In method 795 only those devices that satisfy an activity criterion need to be accounted for in a set of subsets. At step 735 a candidate device is selected such that the candidate device is not already in a subset and the candidate device satisfies an activity criterion. At block 775 the method determines if all devices from the plurality of devices that satisfy an activity criterion and are in a subset. A single activity criterion can be a threshold for sensor data and can be established for all devices in the plurality of devices or each device can have an individual associated activity criterion. The activity criterion can be based on a minimum level of sensor signal indicative of human presence. A central controller can establish activity criterion for each device in the plurality based on analysis of training data or sensor data. In some cases the activity criterion can be a threshold for sensor data that is above the noise floor of sensor data established by analysis of background data when no people are present. For example, a motion sensor operable to report motion on a scale of 0-255 in sensor signals to a central controller can have a noise floor of value 30 caused by the HVAC system and can have an activity threshold of 55. The activity criterion can be based on training data indicating that when a single person is in the enclosed space the peak motion sensor reading is in the range of 200 to 255. In some embodiments the activity criterion can be equivalent to the detection threshold for each device. For example, a motion sensor with digital output (e.g. motion "DETECTED" or "NOT DETECTED") can have an activity criterion equal to "DETECTED", such that when sensor data indicates motion detected the motion sensor device must be included in the set of subsets in method 795. Conversely in cases wherein the motion sensor reports no motion detected the activity criterion is not satisfied and the motion sensor does not have to be accounted for in a set of subsets.

FIG. 8A illustrates an exemplary hash table with aggregated training data according to an embodiment of the present invention. Referring to FIG. 4 and FIG. 8A device D1 can be motion sensor 120a, device D2 can be computer 120d in FIG. 4, device D3 can be IP camera 120e in FIG. 4 and device D4 can be motion sensor 120f. Data corresponding to devices D1, D2, D3, D4 is represented in column 802,804,806 and 808 respectively. Upon satisfaction of a training criterion training data can be added to the hash table 800. Over the course of several sessions of training data over days or weeks a frequency distribution can emerge, corresponding to the frequency of various combinations of training data and illustrated in column 810. In this way the hash table can be based on the layout of the enclosed space 400 and based on the placement of the devices in the network of device. Over time the hash table can indicate the frequency with which various combinations of sensor data occur when one of a set of training criteria are satisfied. The frequency distribution of events in the hash table (e.g. column 810) is also a function of the detection thresholds for each device.

Each row of the hash table 800 represents one of 16 vectors of training data. It can be appreciated that a single device can report more than one dimension of training data. Therefore a device can contribute several columns of data corresponding to different sensors within the device. It can also be appreciated that the training data corresponding to a device can be divided into more granular indications than simply 1=detected and 0=undetected, thereby resulting in more training data vectors. For example, if each device in the network reported data from two sensors each with a range 0-3 the equivalent hash table could have 8 column and $4^8$=65536 possible vectors or rows.

Training data vectors can be divided into two categories, those with non-zero frequency for example 812-818 and those with zero frequency, illustrated as 819-827. For example, vector 817 indicates that a single occupant can simultaneously generate sensor data indicative of presence at D1 and D3 simultaneously. Referring to FIG. 4 D1 is a motion sensor in an office (for example a motion sensor in a light switch) and D3 is an IP camera in the hallway (e.g. a Nest Cam available from Nest Inc. of Palo Alto Calif.). It can be appreciated that a person standing in a doorway could be sensed by both D1 and D3 simultaneously. An aspect of several embodiments of this disclosure is that once the training criterion is satisfied (e.g. by 506) such the range of coincident training data vectors (e.g. 812-818) emerge from the hash table with sufficient training data. Following the emergence of groups of training data vectors with common attributes (e.g. can be generated by a single occupant) another aspect of this disclosure is to generate characteristics (e.g. rules) defining the boundaries of such groups in the variable space. Turning to training data vectors with zero frequency (819-827) in column 810 it can be seen that D4 cannot be activated simultaneously with any other device. Hence a group can be generated with all those vectors where D4 is activated with another device and that group can have the characteristic that it cannot be accomplished by a single person.

The hash table 800 is one exemplary embodiment of a data storage structure generated by training data aggregator 507. Once sufficient data has been aggregated the single occupant characteristic generator 510 can process the training data to identify patterns or characteristic rules. The rules can group several training data vectors according some commonality in the test vectors. In this way a single occupant characteristic can identify a boundary in the variable space where an attribute changes value.

FIG. 8B illustrates a number single occupant characteristics according to an embodiment of the present invention. For example, processing training data at characteristic generator 510 can generate a single occupant characteristic 830 in FIG. 8B that states D1 and D4 must not be active simultaneously when a single occupant is present in a region of the enclosed space sensed by D1 and D4. This rule captures the learning from four training data vectors 823, 824, 825, 827 each of which has zero frequency. This characteristic 830 can be added to the single occupancy criterion for enclosed space 400. When the computer implemented method 700 is executed, in order for an identified subset of devices in the solution set to contain both D1 and D4, characteristic 830 dictates that the sensor data corresponding to D1 and D4 must not simultaneously indicate person presence. The computer implemented method 700 can be iteratively applied and those instances where D1 and D4 indicate simultaneous person presence the method provides for D1 and D4 occupying separate subsets. Other examples of single occupant characteristics from hash table 800 are indicated by 835, 840 and 845. Single occupant characteristics 830, 835, 840 and 845 are examples of concurrent characteristics because they indicate boundaries of sensor data that can occur simultaneously and be accounted for by a single occupant. In one embodiment characteristics can be generated from a hash table until each training data vector with zero frequency is accounted for by at least one characteristic.

Turning to FIG. 9 a hash table (e.g. 900) can be extended to store the frequency with which sequences of training data occur. Column 940 represents the frequency of four sequences of training data 950, 960, 970 and 980. The first four columns 910 represent vectors of training data at a first time. The second four columns 920 represent training data for the same devices D1-D4 at a later time. The third set of four columns 930 represents training data for the same devices D1-D4 at an even later time. It can be appreciated that a single occupant moving within a region 410 of an enclosed space 400, can only be sensed by the plurality of devices D1-D4 according to a subset of all possible sequences. In one aspect of several embodiments of method 600, upon satisfaction of a training criterion from a set of training criteria, training data including sequences of data can be added to extended hash table 900. Over time patterns of possible training data sequences can emerge based on the internal layout of the enclosed space 400. For example, vector 950 illustrates that a single occupant can be sequentially sensed by D1 followed by D3, followed by D4. However vector 960 has a zero frequency thereby indicating that it is likely impossible for a single occupant to account for a sequence wherein device D1 senses a person followed by D4 with no intermediate devices sensing a person. Likewise 970 illustrates a zero-frequency training data sequence and 980 represents well-precedented training data sequence with a frequency of 21. Extended hash table 900 can be generated and stored by the training data aggregator 507. The single occupant characteristic generator 510 can process the extended hash table to identify characteristic that either exemplify non-zero frequency vectors or account for each of the zero-frequency vectors. For example, characteristics 990 and 995 are generated base on vectors 960 and 970. Single occupant characteristics 990 and 995 are examples of sequential characteristics because they indicate the boundaries of sequential sensor data that can be accounted for by a single occupant. It can be appreciated that there are 4096 possible combinations of data for three time periods and four devices D1-D4. Hence when processing sensor data to estimate a number of occupants, it can save considerable time and resources to preprocess the training data and generation single occupant characteristics operable to delineate the boundary between groups of vectors that can and cannot be generated by a single occupant.

Figure 10B:
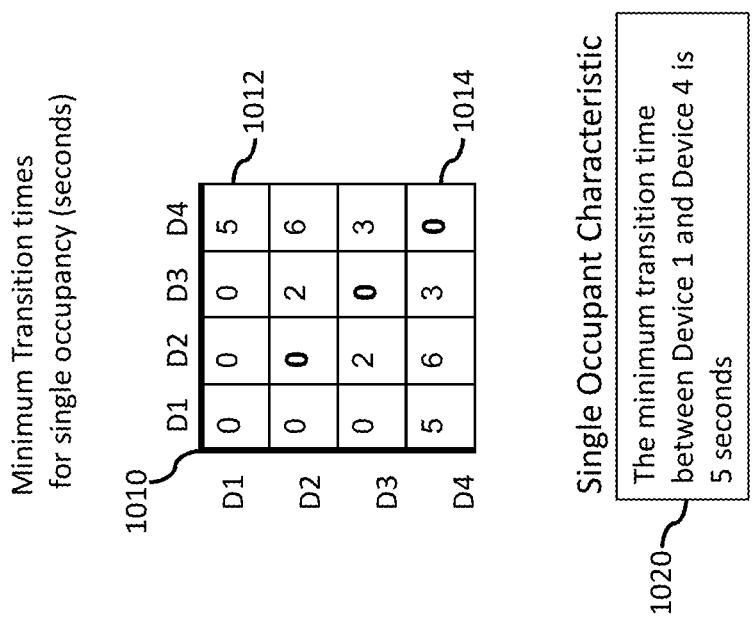
FIG. 10B illustrates a frequency distribution of transition times between two devices in an enclosed space in accordance with an embodiment of the present invention.
Figure 10A:
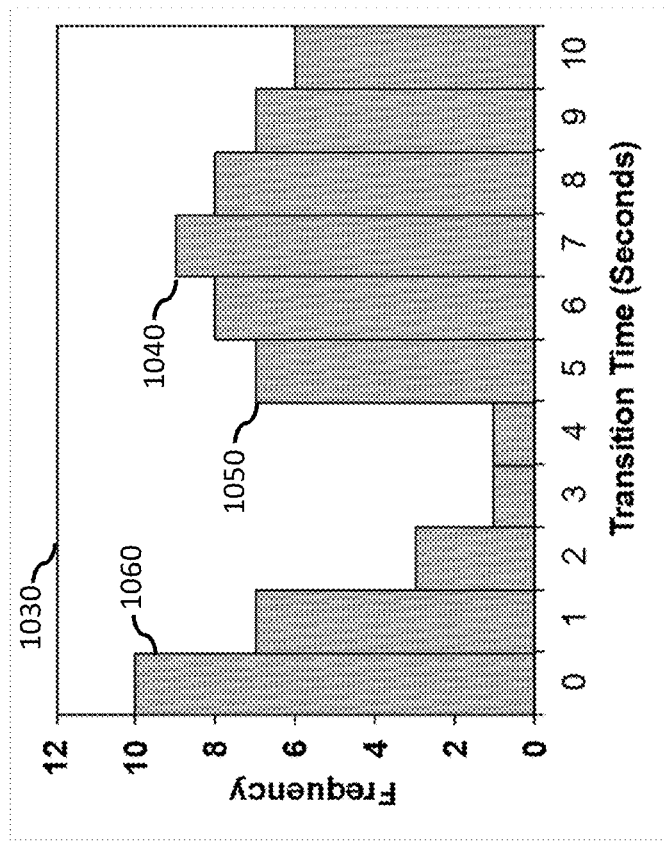
FIG. 10A illustrates a matrix of minimum transition times for a single occupant and an associated single occupant characteristic in accordance with an embodiment of the present invention.

Turning to FIG. 10A, matrix 1010 illustrates the minimum transition time between pairs of devices when a single occupant is present. For example, 1012 is an element of the transition matrix that indicates the minimum time between motion sensor 120a (D1) sensing a person and motion sensor 120f sensing a person can be 5 seconds. The diagonal elements (e.g. 1014) indicate that the minimum transition time to the same device is typically zero seconds. Matrix 1010 can be generated and stored by the training data aggregator 507 and used by the single occupant characteristic generator 510 to generate characteristics such as 1020. FIG. 10B illustrates a graph 1030 of the time distribution between sensing presence at D1 and sensing presence at D4. The distribution has two peaks at 1040 and 1060. The peak at 1040 includes those journeys performed by a single occupant, as well as some transitions performed by multiple people (e.g. one person is studying in the office with D1 and another person is in the office with motion sensor D4 and the two people are sensed seven seconds apart). Column 1050 represents the lower bound of transition times between D1 and D4 that can be accounted for by a single person. The occupant number estimator 526 can quickly identify that transition times less than 1050 (e.g. 3 seconds) cannot be accounted for by a single occupant and place D1 and D4 in different subsets accordingly when such instances arise during method 700. The peak at 1060 represents the nearly simultaneous sensing of a person by D1 and D4 that can occur when multiple occupants are in region 410.

Single Occupant Criterion

FIG. 11 illustrates a single occupant criterion 1110 comprising a plurality of single occupant characteristics in accordance with an embodiment of the present invention. At block 740 the computer implemented method applies the single occupancy criterion to a subset of sensor data. In several embodiments the subset can comprise an existing subset, known to satisfy the single occupancy criterion and a candidate device. A single occupancy criterion (e.g. 1110) can be satisfied by a subset of devices if the sensor data in a subset data satisfied the criterion. A criterion can be unsatisfied if the sensor data fails the criterion. In other embodiments sensor data can be scored on the basis of a measure of the degree to which sensor data in the subset satisfies the single occupancy criterion.

In some embodiments the SOC is satisfied if at least one characteristic in the criterion is satisfied by the candidate subset of sensor data. In some embodiments the SOC is satisfied if all characteristics are satisfied by the candidate subset of sensor data. In yet other embodiments each characteristic in the SOC can be scored according to the candidate subset of sensor data. In this case a candidate subset can satisfy the SOC upon satisfaction of a scoring criterion based on the scores for some or all of the characteristics or the combined score for the SOC. A scoring approach to satisfying the SOC has the advantage of introducing a degree of flexibility and probability into the step of determining if a single occupant can account for a subset of sensor data. For example, consider two microphones as part of a security system located on the top floor of an office building. A single occupant characteristic could states: a single occupant sensed at microphone #1 with sound intensity A will be heard at microphone #2 with a peak intensity in the range 0-A/2 with 90% confidence.

Pass/Fail Example

In one exemplary embodiment at block 740 of method 700 a SOC can be applied to a candidate subset comprising microphone #1 and microphone #2. A peak sound reading of magnitude A/4 at microphone #2 can satisfy the SOC when applied to this candidate subset (both microphones). Therefore, in the context of a time period where microphone #1 and microphone #2 satisfy the SOC their combined sensor data can plausibly be accounted for by a single occupant. Upon satisfaction of the SOC the candidate subset can be subsequently considered an existing subset, in the iterative process of building on existing subsets or forming new subsets. Conversely, a sound measurement of 1.5 A at microphone #2 would cause the candidate subset (e.g. both microphones) to fail to satisfy the SOC. In the context of a time period where microphone #1 and microphone #2 do not satisfy the SOC, these devices are assigned to separate subsets by the occupancy test method (e.g. 700 or 790)

Scoring Example

In another exemplary embodiment, method 700 or 790 scores subsets of sensor data according to the SOC. At block 740 of method 700 a SOC is applied to a candidate subset comprising sound measurements from microphone #1 and microphone #2. A scoring criterion can state that the score for the candidate subset must remain at or below 10 in order to satisfy the SOC. The method 700 can assign a score of 0 to sound data of magnitude A/4 measured at microphone #2. A score of 2 can be assigned to a sound measurement of 0.55 A, thereby indicating the possibility of multiple occupants in the subset because the value 0.55 A it is greater than 90% of the sound measurements when only one person is present. Similarly, a sound measurement of 2 A can receive a score of 11, thereby ensuring the candidate subset including microphone #1 and microphone #2 does not satisfy the SOC based on the scoring criterion of 10.

A PASS/FAIL embodiment can be considered a special case of a SCORED embodiment, wherein satisfaction of a characteristic in the SOC satisfaction generates a score of zero and failure to satisfy a characteristic generates a score greater than zero and the scoring criterion is that the combined score for the SOC must be zero. In this way all characteristics must be satisfied (passed) with a combined score of zero in order to pass the occupancy test. In another example an embodiment wherein the SOC is applied at block 740 in a PASS/FAIL manner can be considered a special case of a SCORED SOC application, wherein satisfaction of each single occupant characteristic by a candidate subset generates a score of N and failure to satisfy generates a score less than N and the scoring criterion is such that the combined score for the SOC must be at least N*M, where M is the number of single occupant characteristics in the SOC. In this way all characteristics must be satisfied in order to satisfy the SOC.

Turning again to FIG. 11, in another example SOC 1110 can be applied to sensor data vector 1120. Column 1125 can represent the score assigned to each characteristic based on the sensor data for the four devices in vector 1120. Sensor data 1120 is illustrated as raw sensor values instead of processed indications of DETECTED (e.g. 1) or UNDETECTED (e.g. 0). Device D3 shows some data that could be indicative of the presence of a person or could be a non-human background source. Therefore single occupant characteristics 835 and 845 are not completely satisfied and column 1125 reflects a non-zero score. If the scoring criterion to satisfy the SOC is a combined score of less than 10 we can see that sensor data 1120 satisfies the scoring criterion and hence the SOC. Turning to another sensor data vector 1135 The combination of presence indications at D3 and D4 are sufficiently large to generate substantial non-zero scores in column 1130 and hence sensor data vector 1135 does not satisfy the SOC 1110 when a scoring criterion of "less than 10" is applied. Hence application of the occupancy test method 700 or 790 to vector 1135 would result in a set of subsets with two or more subsets.

Figure 12:
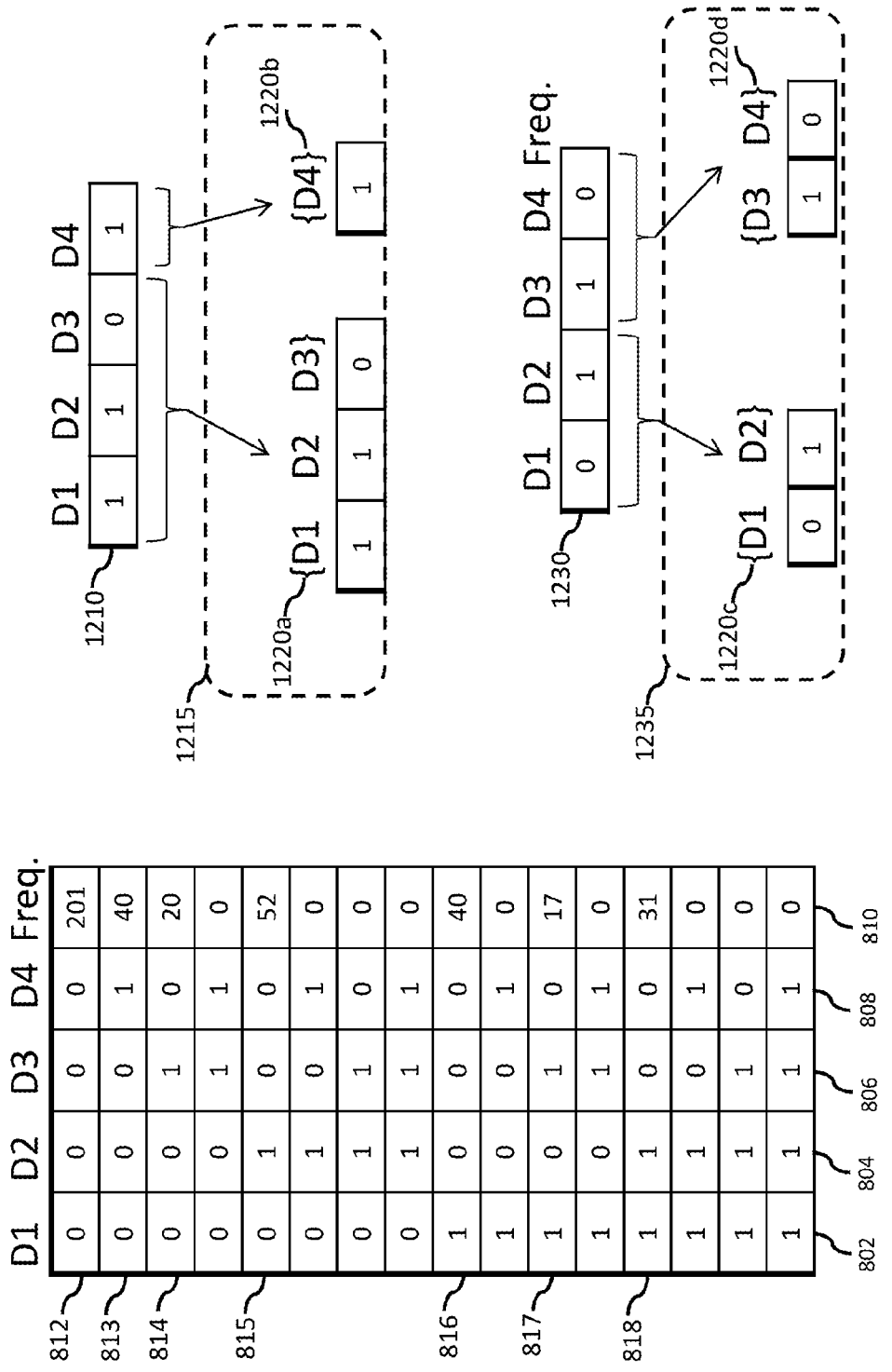
FIG. 12 illustrates an example of generating a set of subsets of devices according to a single occupancy criterion in accordance with an embodiment of the present invention.

FIG. 12 illustrates an example of generating a set of subsets of sensor data according to a single occupancy criterion in accordance with an embodiment of the present disclosure. A vector of sensor data 1210 can be processed as follows: At block 705 a plurality of devices D1-D4 can be identified corresponding to a region of interest within an enclosed space (e.g. 400). At block 710 signals can be received form the plurality of devices D1-D4. At block 710 sensor data vector 1210 can be aggregated by sensor data aggregator 508. A block 720 a single occupancy criterion can be obtained (e.g. from memory 520). At block 730 candidate device D1 can be selected and since there are no other subsets (as is typical when method 700 begins) a new subset S1 is generated such that the set of subsets is given by S={S1} and S1={D1}. The method returns to block 730 and selects D2 as a candidate device. At block 740 the computer recognizes that the addition of D2 to S1 still satisfies the SOC (e.g. vector 818 of hash table 800 has D1=1 and D2=1). Specifically D1 and D2 can occupy the same subset because their combined sensor data can satisfy the SOC. The method again returns to 730, selects D3 as a candidate device and adds D3 to S1 at block 740 (e.g. S1={D1, D2, D3}).

One way to observe the validity of subset S1 is to observe that at least one non-zero vector in hash table 800 matches the sensor data "1, 1, 0" for subset S1. The method returns to 730, selects D4 as the candidate device. Device D4 cannot be added to any existing subset, because of the indication of occupancy in sensor data for D4. Hence a new subset S2 is formed for D4. The final set of subsets 1215 is given by S={{D1, D2, D3},{D4}}, and comprises two subsets (1220a and 1220b). At block 780 the method can estimate the number of people in the region of D1-D4. For example, the method can estimate that two people are present corresponding to the two subsets. In another example the method can estimate that one person is present because one of the two subsets (e.g. S2, 1220b) often occurs due to false positive reading at D4. At some short time later the computer implemented method 700 can process a subsequent sensor data vector 1230 and identify the set of subsets 1235 given by S={{D1,D2},{D3,D4}}, corresponding to subsets 1220c and 1220d.

Figure 13:
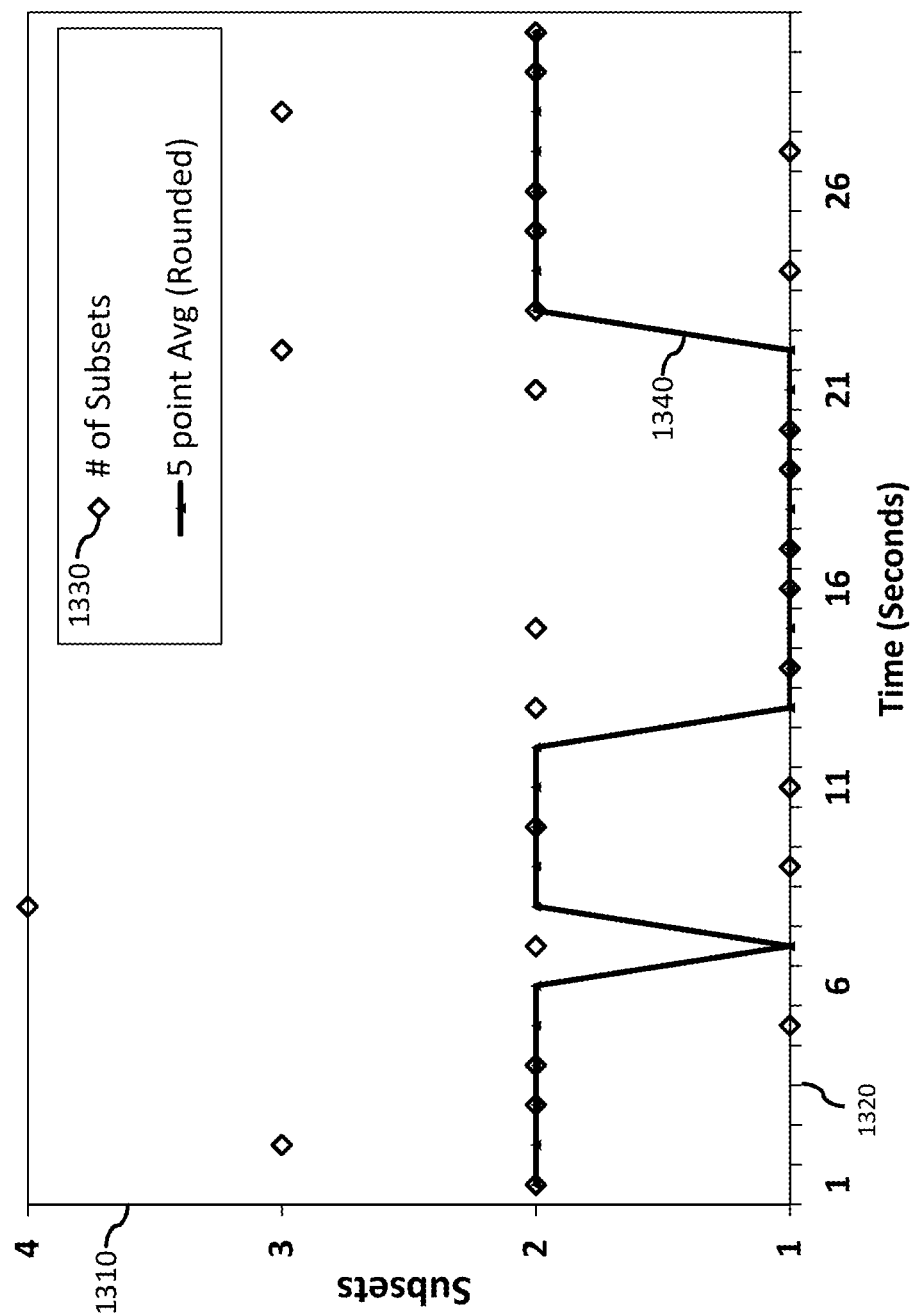
FIG. 13 illustrates a time series of the number of subsets from repeated application of an occupancy test method and a time averaged measure of the number of subsets according to a single occupancy criterion in accordance with an embodiment of the present invention.

FIG. 13 illustrates a time series of the number of subsets (diamonds) and time averaged number of subsets (solid line) in the set of subsets, resulting from repeated application of an occupancy test method (e.g. 700 or 790). As FIG. 13 illustrates the instantaneous number of subsets generated be the method can vary with time. For example, two people in close proximity to each other can cause sensor data that indicates a single person. Similarly, method 700 can estimate fewer people in the region if their associated sensor data is weak because they are inactive of obscured from the field of view of a sensor (e.g. blind spots in a network of IP cameras or CCTV cameras). In some circumstances the number of subsets in the set of subsets can overestimate the number of people, such as false-positive sensor data from devices (e.g. the sound of a HVAC system, television) or motion caused by pets.

In one aspect of several embodiments, an occupancy test method (e.g. 790) can be repeatedly applied, and an estimate of the number of people in a region (e.g. 410) can be based on the size of several previous solution sets. For example, the solid line in FIG. 13 illustrates average number of subsets identified by the previous 5 applications of the occupancy test method. While the instantaneous number of subsets varies, the time averaged number of subsets indicates 2 people in the region up until the 12 second time mark, 1 person in the region between 12 seconds and 21 seconds and 2 people in the region after 21 seconds. Other examples of processing current and previous numbers of subsets in the process of estimating the number of people include, removing outliers removal or calculating confidence levels or the standard deviations. In other embodiments the estimated number of people in a region can be based on the maximum or minimum number of subsets calculated during a number of previous iterations of the occupancy test method. For example, if a computer implementation of the occupancy test method is known to underestimate the number of occupants more often than overestimate he number of occupants the occupancy estimate can be based on the maximum number of subsets reported during some previous number of applications of the occupancy test method.

Figure 14:
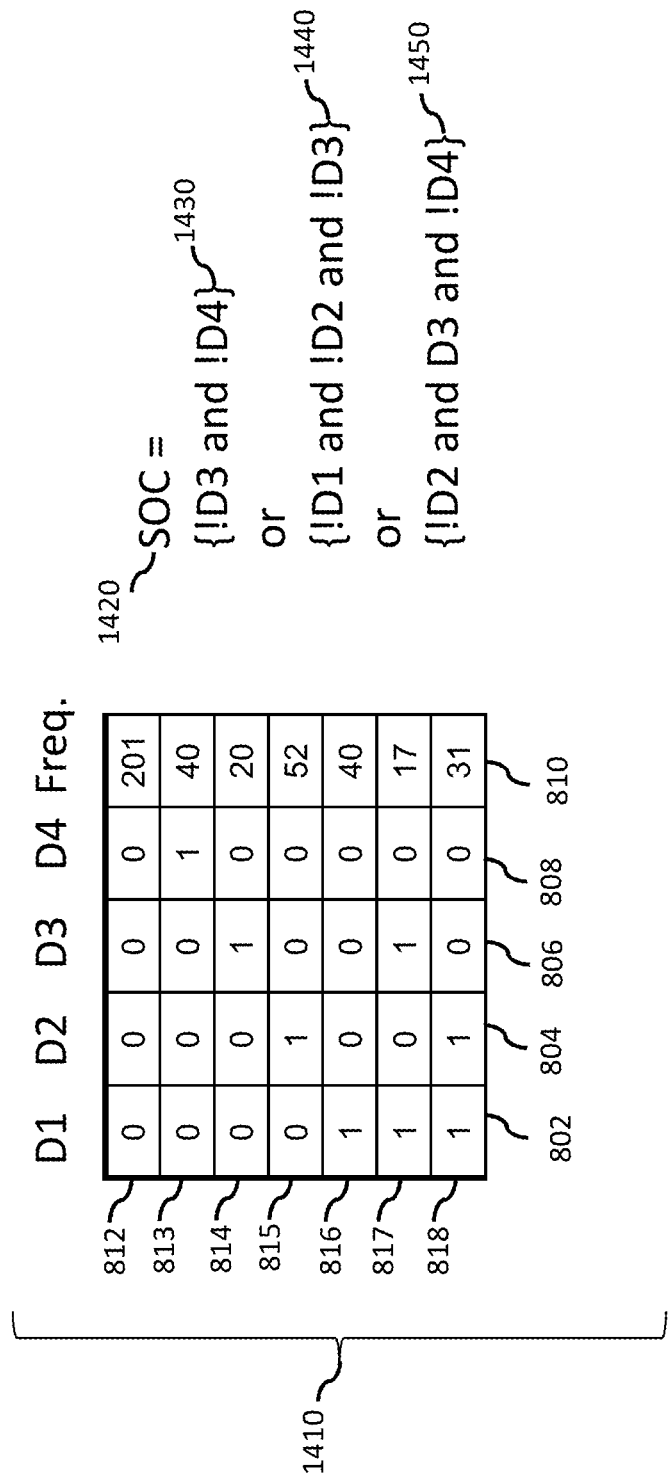
FIG. 14 illustrates a single occupancy criterion comprising a plurality of single occupant characteristics in accordance with an embodiment of the present invention.

FIG. 14 illustrates a single occupancy criterion 1420 comprising a plurality of single occupant characteristics (e.g. 1430, 1440 and 1450) in accordance with one embodiment. Training data in hash table 800 can be used to generate SOC 1420. Specifically, the SOC can delineate the bounds of the subset 1410 of training data vectors with non-zero frequency within the complete variable space illustrated by hash table 800. The SOC can be considered a complete set of single occupant characteristics if the SOC is satisfied for all training data vectors with non-zero frequency. For example, SOC 1420 is complete based on hash table 800. While the variable space in this example is small (e.g. 16 possible combinations of a single bit of data from four devices D1-D4), the method can be scaled to a large number of devices with the potential for a plurality of sensors within each device and a large range of data values from each sensor. For example, a 2 megapixel IP camera can produce a very large number of training data vectors when the potential correlations with other devices in the smart building are considered. Serial evaluation of raw training data vectors to identify occupancy would be time consuming and resource intensive for a computer. Hence one aspect of several embodiments of the occupancy test method is to process training data (e.g. 1410) to identify simplified characteristics (e.g. 1430, 1440 and 1450) each accounting as many training data vectors as possible. It can be appreciated that SOC 1420 can be satisfied if any one characteristic is satisfied. In some embodiments the frequency of data vectors can be recorded during training and subsequent operation and characteristics corresponding to high frequency vectors can be evaluated first. In this way a processor can save time by evaluating the most likely characteristics first.

Turning to FIG. 15 another SOC 1520 is illustrated comprising a plurality of single occupant characteristics 1530, 1540 and 1550. SOC 1520 is satisfied by sensor data if the sensor data avoids each of the zero occupancy training data vectors in the set 1510. It can be appreciated that with sufficient training data SOC 1420 and SOC 1520 can yield the same result when applied to sensor data. In some embodiments when only limited training data has been gathered the training data aggregator 507 can generate a sparse hash table, wherein there are many zero-frequency vectors that may become populated with more training data. In this situation it may be beneficial to generate a SOC of the form of 1420, encompassing known non-zero frequency vectors. When an enclosed space (e.g. 400) has been characterized by more training there may be fewer zero-frequency vectors and it can be beneficial to represent the SOC in the form of 1520 as a set of characteristics encompassing training vectors that cannot be generated by a single occupant.

FIG. 14 and FIG. 15 illustrate that a SOC can delineate the boundaries of portions of the solution space that can be accounted for by a single occupant and can be represented in the form of a Boolean logic expression (e.g. 1420 and 1520). It can be appreciated that repeatedly applying the SOC to sensor data can consume significant computer resources. This resource demand can be a challenge as sensor data becomes more detailed (e.g. an IP camera providing all pixel values and not just an indication of PRESENT or NOT PRESENT) and the number of devices in smart buildings grows. In order to address this challenge one aspect of several embodiments is to configure dedicated hardware (e.g. a field programmable gate array) based on the SOC. Hence the computer implemented method can customize the original hardware based on the SOC to account for the Boolean logic that represents the SOC (e.g. 1420 or 1520). One example of a hardware component configured based on the SOC is a co-processor or hardware accelerator unit of a system-on-chip (SoC) operable to be configured by a main CPU to apply the SOC to sensor data.

Figure 16:
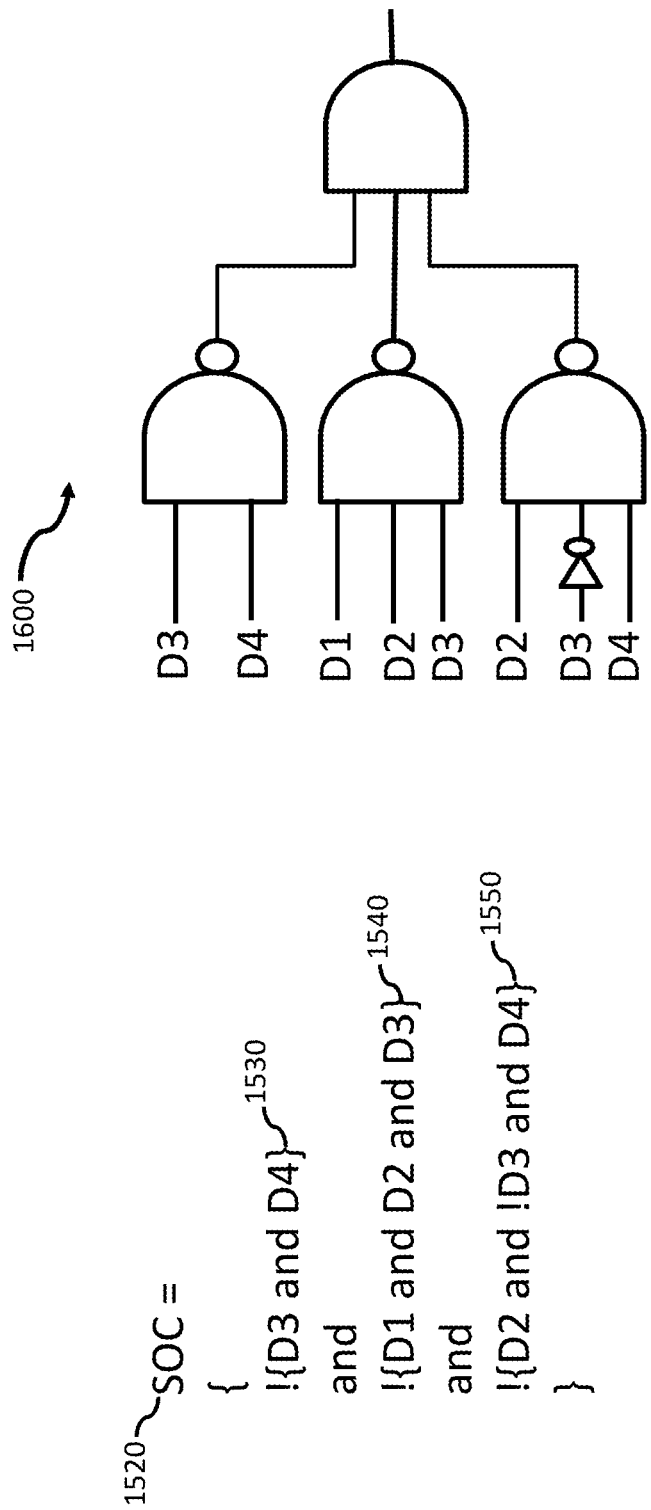
FIG. 16 illustrates a logic circuit operable to implement a single occupancy criterion in accordance with an embodiment of the present invention.

Another example of hardware configured to enhance the speed of applying the SOC is a field programmable gate array configured with the SOC. A typical CPU may evaluate each characteristic (e.g. 1530, 1540 and 1550) of the SOC in a sequential manner. FIG. 16 illustrates a parallel logic circuit 1600 operable to evaluate characteristics 1530, 1540 and 1550 in parallel. Hence an FPGA can be configured with the SOC and thereby perform step 740 of the method considerably faster than a standard processor. It can be appreciated that the configuration of the FPGA can change as additional training data is gathered. Therefore the reprogrammable nature of the FPGA is well suited to implement the SOC as it evolves.

In another embodiment, the SOC can be implemented in a neural network processor or neural network portion of a system-on-chip. At the core or several embodiments of the occupancy test method is the process of rapidly evaluating the minimum number of subsets to account for a plurality of devices, while satisfying the SOC. In a newly installed network of devices the characteristics (e.g. cross correlations), thresholds and background noise are unknown. Neural networks can be effective at generating single occupant characteristics, such as data patterns (e.g. object recognition in images).

A neural network processor or portion of a processor can also be effective for increasing the speed of evaluation of the SOC. One example of a neural processor is the CM1K microchip available for NeuroMem of Petaluma Calif. The CM1K is a chain of 1,024 identical neurons that operate in parallel but are connected together to make global decisions. A neuron is 256 bytes of SRAM with some associated programmable logic to compare an incoming pattern with a reference pattern held in memory and to "fire" according to its similarity. Collectively the neurons behave as a K nearest-neighbor classifier. They are well-suited to working with ill-defined and fuzzy data and a high variability of context.

Alternative Embodiments

Figure 17:
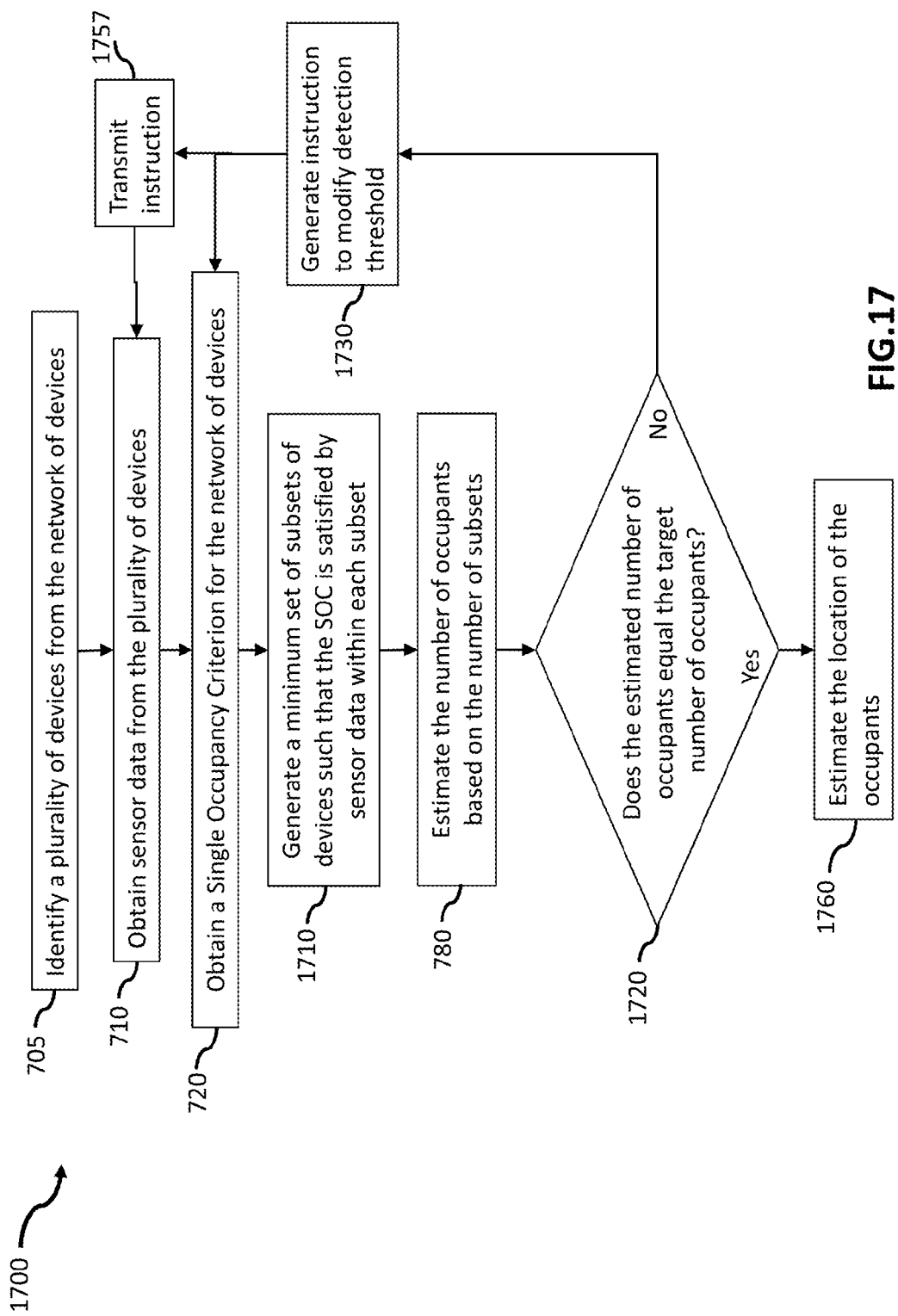
FIG. 17 is a flow diagram of a process of altering a detection threshold to locate a target number of people in the range of a plurality of devices in accordance with an embodiment of the present invention.

FIG. 17 is a flow diagram illustrating a process of altering a detection threshold to locate a target number of people in the range of a first plurality of devices in accordance with an embodiment of the present invention. The method 1700 is similar to method 700 and begins with the same steps of identifying a plurality of devices associated with a region of the indoor space for which occupancy will be estimated. At block 1710 the method combines steps 730, 740, 750, 760 and 770 to generate the smallest set (e.g. 1215 or 1235) of subsets, wherein all devices are accounted for and all subsets satisfy the SOC. One exemplary method to generate the smallest set of subsets at 1710 is to iteratively forming the largest subset possible with the greatest number of previously unaccounted for devices form the plurality of devices until all devices are accounted for in at least one subset. At block 780 method 1700 estimates the number of occupants based on the number of subsets of devices generated or identified. At block 1720 the estimated number of occupants is compared to a target number of occupants. The target can be based on one or more previous estimates of the number of occupants. The target number of occupants can be based on a moving average of several previous occupancy estimates or based on previous estimates in conjunction with data indicative of a number of people entering or leaving the region (e.g. there have been no exterior door opening events or there has been two elevator rides to or from a particular floor of an office building). At block 1702 if the estimated number of people does not equal the target number a detection threshold can be modified at block 1730. The modification of the detection threshold can be performed by generating an instruction to a device form the plurality to modify a detection threshold. Alternatively the modified detection threshold can be applied to sensor data received (including previously received sensor data.

In alternative embodiments method 1700 can generate instructions to change the rate of data acquisition (e.g. from 1 Hz to 10 Hz) in an effort to generate denser sensor data and thereby effectively search for people to meet the target number. The instruction to change a detection threshold can be executed locally (e.g. a central controller performing method 1700) or the instruction can be transmitted to one or more devices in the plurality and change the detection threshold of the raw sensor data. In one example a target of two people can be stored based on previous estimates for occupancy on a floor of an office building. At a later time block 1710 identifies the minimum number of subsets of devices is one. The corresponding occupancy estimate is one and the method identifies a discrepancy ay block 1720. The second person may be sitting quietly. An instruction can be generated and transmitted to devices in the last known location of the second person to decrease their detection threshold. For example, a motion sensor can reduce the degree of motion needed to trigger the operational amplifier in the detector or an IP camera can reduce the threshold for pixel variation from one frame to another. New sensor data can be transmitted to a central controller 150 performing method 1700 and a new estimate for the number of people can be generated. In one aspect of several embodiments method 1700 can generate instructions to client devices (e.g. lights and thermostats) to change their performance characteristics when the estimated number of occupants does not match the target number of occupants. For example, lights can stay on longer in locations likely to contain an unaccounted for person. In a security system embodiment method 1700 can output an indication of whether the target number of occupants can be accounted for. For example, a security guard or EMS technician can receive an alert indicating that there is likely an unaccounted for person based on a discrepancy between recent estimates for occupancy and the target occupancy.

The disclosed method provides improvement over legacy building monitoring systems (e.g. network badge readers) because it is not limited to the fixed perimeter of the building. For example, method 1700 could dynamically identify the last subset to have contained the missing occupant. In one embodiment method 1700 can data mine or search the last vector of sensor data prior to the disappearance of one or more occupants from the occupancy estimate to identify aspects of the subset associated with the missing occupant. For example, consider a vector $v1=[1,0,1,1]$ that results in a set of subsets $S=\{\{D1,D2,D3\},\{D4\}\}$. At some time later $v2=[0,0,0,1]$ is repeated measured, resulting in $S=\{\{D1,D2,D3,D4\}\}$. A system running method 1700 can modify the detection thresholds and if the method continues to report an estimated occupancy of 1 an alert can be generated that the last know location of a missing occupant was operable to activate devices D1 and D3 simultaneously. Referring to the indoor area of FIG. 4 this area can be identified as the doorway of the office between the motion detector and the IP camera.

In some embodiments method 700 produces a set of subsets comprising a single subset and no sensor data from the plurality of devices indicates the presence of a person. In this case the method can estimate zero occupants in the region, based in part on the single subset.

Another case covered by embodiments of method 700 is where a single device reports the presence of multiple people in sensor data. For example, an IP camera can process a video image and identify two people within the field of view. In several embodiments of method 700 the subset formation steps (730,740,750,760,770) can treat data from such a device as if it were produced by a single occupant (i.e. sensor data from a device indicating the presence of a person does not preclude the possible of multiple people). In one embodiment, completed method 700 produces a set of subsets comprising N subsets and M devices within the plurality report indications of multiple occupants (e.g. talking in a conference room, or multiple people in a video image). The estimated number of occupants can be based on the number of subsets in accordance with method 700. For example, at block 780 method 700 can estimate the number of people as N+M total occupants.

Figure 18:
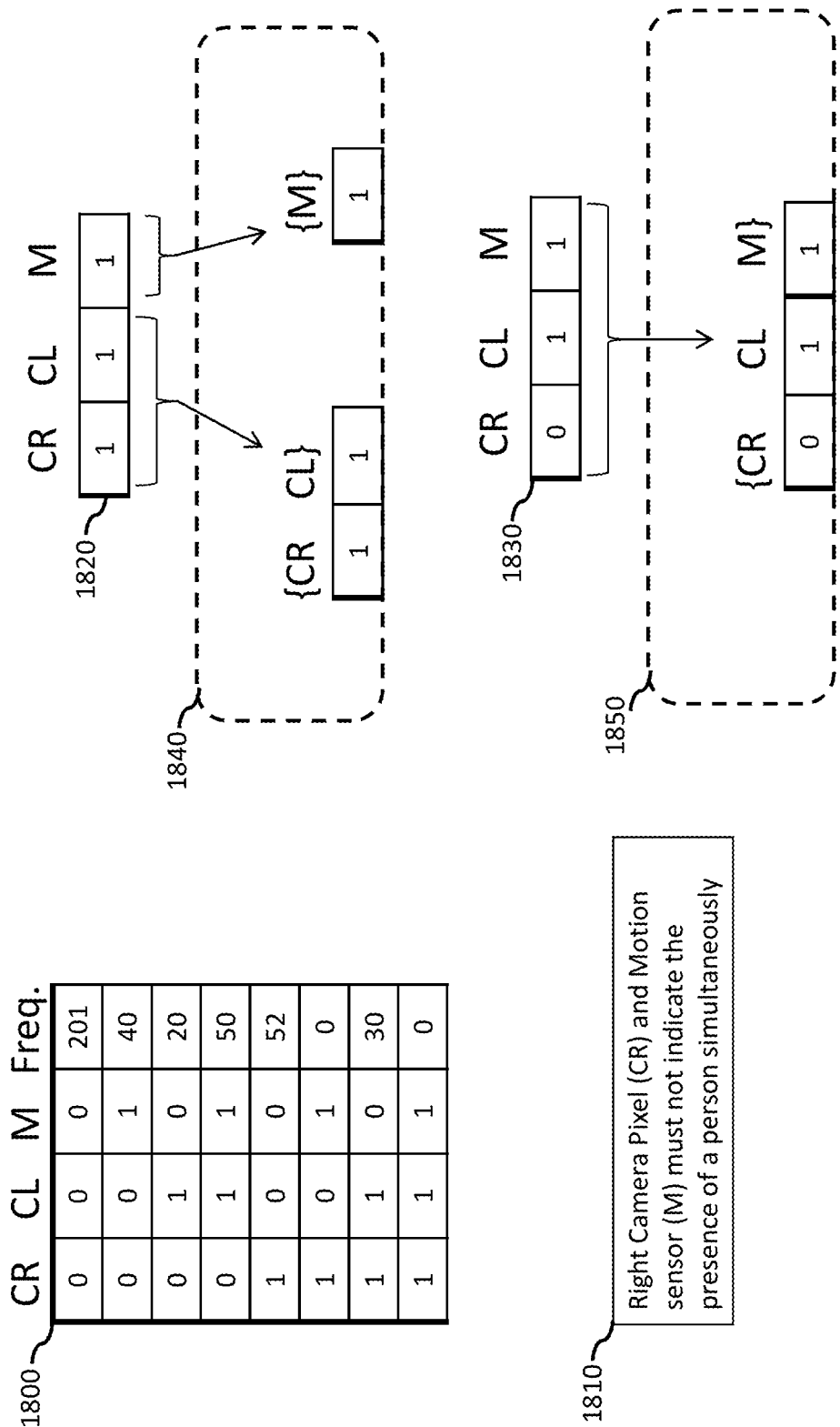
FIG. 18 illustrates an example of generating a set of subsets of devices according to a single occupancy criterion in accordance with an embodiment of the present invention.

In some embodiments a device can contain multiple sensors (e.g. a sound and motion sensor). Method 700 can easily be scaled to accommodate multisensory devices by representing different sensors as different dimensions in sensor data vectors (or training data). FIG. 18 illustrates a training data hash table 1800. A simple two pixel camera with left and right pixels reports sensor data. A motion else wherein the enclosed space sensor also reports data. Single occupant characteristics 1810 can be generated based on the hash table. Sensor data vectors 1820 and 1830 can subsequently be received. Two sets of subsets 1840 and 1850 can be identified based on the SOC comprising the single occupancy characteristic. Subset 1840 can indicate two people in the region, while 1850 can indicate one person. Hence it can be seen that method 700 is easily extendable to multisensory devices. Specifically, when applying step 740 and assigning a multisensory (e.g. multivariable) device to an existing subset, the SOC must be satisfied for all sensor data in the proposed new subset, similar to growing a subset of single sensor devices.

Similar to the concept the a device can comprise a plurality of sensors or dimensions of sensor data, it is also possible to group sensor data from two more devices into a virtual device with the combined person detection capability. For example, sensor data for ten devices can be combined to form two virtual devices each with sensor data from five devices, without losing any dimensionality (i.e. no loss of data). The occupancy test method (e.g. 700 or 790) can be performed to see if the two virtual devices can be places in a common subset. If the answer is yes the single subset can be used to estimate that there is a single occupant amid the ten devices.

One subset of alternative embodiments is when the occupancy test method identifies that the sensor data from the network can be reliably attributed to a single occupant. A central controller can apply the occupancy test method or receive the resulting estimated number of people in the region (e.g. the home). Upon determination that only a single person occupies the home automation services (e.g. lighting, entertainment, heating) can be adapted for a single person. For example, lights can be instructed to turn off once the single occupant has left an area. Lights can be instructed to turn on in advance of their arrival without concern for disturbing other people in those areas. Text messages and voicemail messages from the person's smartphone can be relayed through a network of speakers throughout the building as the person moves through the building. Speakers can be programmed to begin playing music on one speaker and activate additional speakers as the person moves through the building, thereby adapting to the single occupants location and following them with music and audio content. Speakerphone functionality can similarly be transferred from room to room without concern for interrupting other people.

The region in which the occupancy test is applied can be a portion of a building, thereby enabling separate regions each with at most one occupant to be identified. In this way shared building services (e.g. lights, speakers, screens and thermostats) can be adapted to the single occupant in each zone. In one embodiment the central controller can iteratively select a plurality of devices from the network of devices for the purpose of identifying a plurality of devices for which the single occupancy test return a solution set with a single subset, thereby indicating a single occupant in the plurality of devices. In this way a set of subsets from a plurality of devices, wherein each subset satisfies the SOC can be used to customize zones of automation and avoid interference associated with smart devices reacting to more than one occupant in a zone.

In one example the network of devices can include one or more mobile wireless devices (e.g. 130a or 130b). A mobile device can report a location within the enclosed space (e.g. using GPS or indoor positioning system (IPS) technology). The relevance of the reported location of a mobile device depends in large part on the proximity of a person to the mobile wireless device. For example, if the mobile wireless device is left unattended in a room and a single occupant roams throughout the enclosed space (e.g. 400) generating training data the associated mobile device location has little relevance to the bounds of concurrent or sequential sensor data indicating the presence of a person. Conversely, when a mobile device is carried by a person the location and associated signal strength can be relevant to building a hash table of training data. In one example the central controller can assess a proximity criterion on second signals reported from mobile wireless devices. If proximity indications in second signals from a mobile wireless device satisfy the proximity criterion the associated sensor data (e.g. device location or signal strength) can be included in training data. In one example a mobile wireless device 130 (e.g. a smartphone) can measure the signals strength (RSSI) of first signals 140 transmitted by a Bluetooth enabled refrigerator. The smartphone can record and transmit the RSSI values as mobile device location data in second signals 185. The central controller can have previously identified the location of the refrigerator as being in the kitchen of the building and identify first signals 140 from the refrigerator, based on a unique identifier in the Bluetooth signals. The central controller 150 can aggregate and store the signal strength of signals 140 (e.g. from the refrigerator) as reported by the smartphone 130a to the central controller 150 and add these values to the training data hash table. Over time the central controller can identify the peak RSSI typically reported by a smartphone and estimate that the smartphone is located in the kitchen (e.g. the known location of the Bluetooth signals transmitter) during those times. The central controller 150 can compare aggregated RSSI values in second signals 185 with historical values in the training data hash table in the process of estimating the location of the smartphone. The model may also function to improve predictive capability in situations where, mobile devices are either not available or all mobile devices have low or zero proximity to people. In this case, the first data from fixed wireless sensors and the location model 412 can provide a more accurate occupancy estimate. For example, if one or more fixed wireless sensors estimate that a person is in the general region of the kitchen, their location can be further refined by searching for previous instances with similar fixed wireless sensor data patterns from the location model 412. In this case high-confidence previous locations can include situations where mobile device locations with high person proximity weightings were available. In one example sensor data from a mobile wireless device can be RSSI values when person-to-device proximity satisfies a proximity criterion. Proximity can be estimated based on sensor data or based on variations of a signal quality aspect of the second signals (e.g. RSSI values, time of flight delay or bit error rate.).

Figure 19:
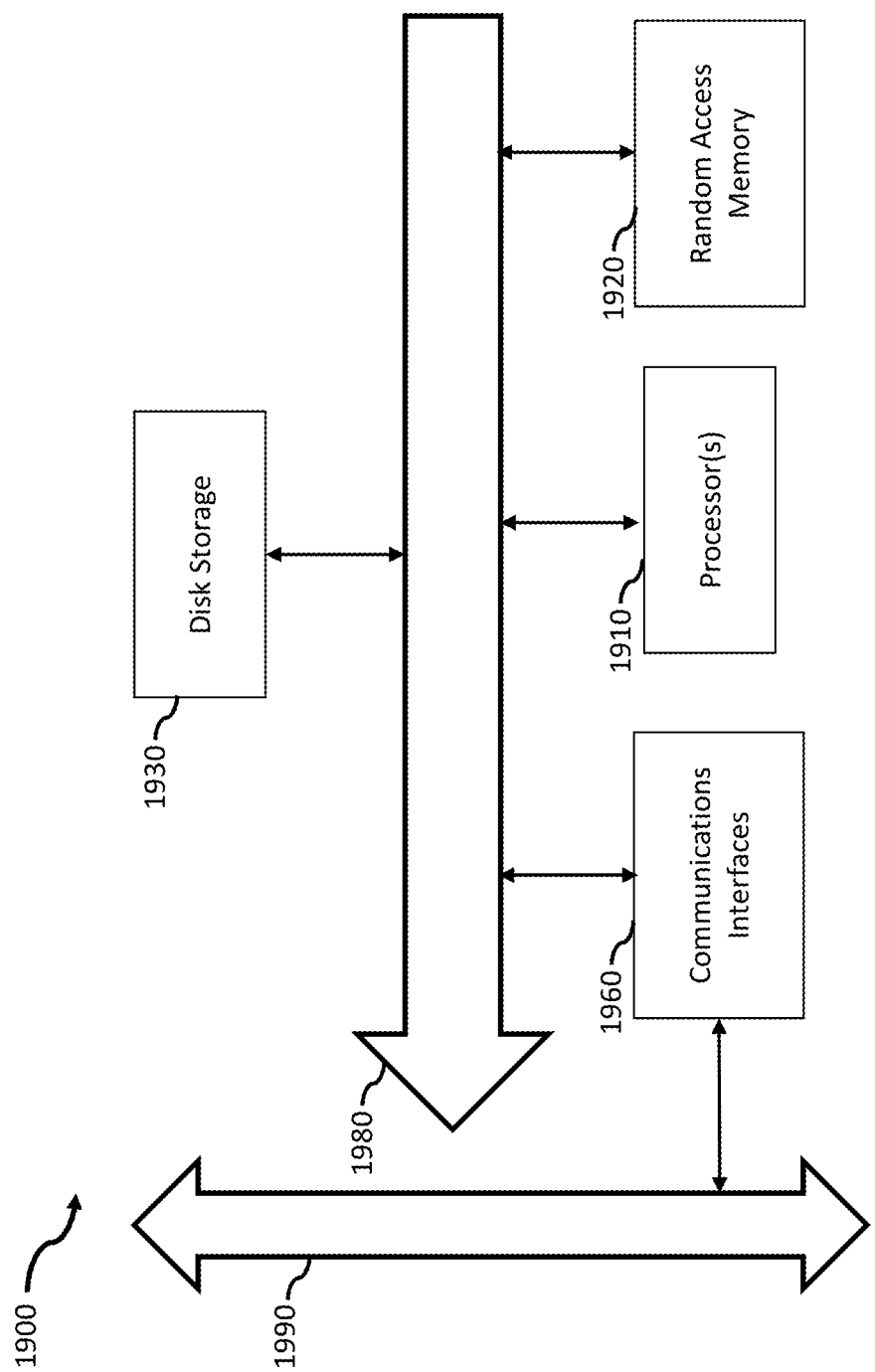
FIG. 19 illustrates an exemplary computer system that can be used to implement embodiments of the present disclosure.

FIG. 19 is a simplified block diagram of a computer system 1900 that can be used in embodiments of the present invention. For example, central controller 150 can incorporate part or all of computer system 1900. As another example, all or part of process 600, 700 and/or 790 can be performed by part or all of computer system 1900. Memory components 1920 and 1930 can hold computer readable instructions operable to perform all or parts of process 600,700 or 790. FIG. 19 is merely illustrative of an embodiment incorporating the present invention and does not limit the scope of the invention as recited in the claims. One of ordinary skill in the art would recognize other variations, modifications, and alternatives.

In one embodiment, computer system 1900 includes processor(s) 1910, random access memory (RAM) 1920, disk storage 1930, communications interface(s) 1960, and a system bus 1980 interconnecting the above components. Other components can also be present. RAM 1920 and disk drive 1930 are examples of tangible media configured to store data such as audio, image, and movie files, operating system code, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

Embodiments of communications interface 1960 can include computer interfaces, such as include an Ethernet card, wireless interface (e.g., Bluetooth or Wi-Fi), a modem (telephone, satellite, cable, ISDN), (asynchronous) digital subscriber line (DSL) unit, FireWire interface, USB interface, and the like. For example, communications interface 1960 can include interfaces to connect to a wireless network 1990, and for transmitting and receiving data based over the network. In various embodiments, computer system 1900 can also include software that enables communications over a network such as the HTTP, TCP/IP, RIP/RTsp protocols, and the like. In alternative embodiments of the present invention, other communications software and transfer protocols can also be used, for example IPX, UDP or the like.

In various embodiments, computer system 1900 can also include an operating system, such as OS X®, Microsoft Windows®, Linux®, real-time operating systems (RTOSs), embedded operating systems, open source operating systems, and proprietary operating systems, and the like. System 1900 can also have other components e.g., user interface with keyboard, buttons, monitors, indicators, and the like.

FIG. 20A illustrates an exemplary transition matrix 2010 between devices in the plurality of devices. Transition matrix 2010 is another way to store some of the training day or sensor generated by various embodiments of method 600,700,790 and 795. Matrix 2010 shows the device with the greatest indication of presence relative to the immediately prior measurement. In other words matrix 2010 illustrates where the greatest indication of presence "transitions to" relative to an immediately previous time period. For example, element 2011 illustrates that there are 200 instances of greatest indication of presence transitioning from D1 to D1, indicating that a person was sensed most strongly at D1 in two consecutive measurements. Element 2012 shows there are 100 instances of a person transitioning from D1 to D2, while 2013 illustrates that there are 150 instances of a person transitioning from D2 to D1. In embodiments where a transition matrix is formed from sensor data there can be multiple people in the enclosed space and all matrix elements can be non-zero. In embodiments where the transition matrix is formed from training data when a single occupant is present several elements can be zero (e.g. 2014) indicating no instances of a person transitioning between pairs of elements. It is interesting to note that the diagonal elements (e.g. 2011) are a measure of how long a person dwells at a location. Devices such as computer D2 have long dwell times and large corresponding diagonal elements. Other devices (e.g. IP camera D3) are located in high traffic areas (e.g. hallways or stairwells). Accordingly D3 can have low dwell time (e.g. element 2015) but large instances of transitions between otherwise disconnected locations (e.g. elements 2016 and 2017). Transition matrix 2010 can therefore hold considerable information and insights regarding the physical arrangement in an enclosed space. FIG. 20B illustrates a network graph 2020 corresponding to transition matrix 2010. The diagonal elements of matrix 2010 are used to determine the size of nodes (e.g. 2030, 2040 and 2050). The off-diagonal elements of matrix 2010 are used to define aspects (e.g. size, thickness or length) of the interconnections between nodes. Network graph 2020 provides an intuitive diagram of the layout of devices in the network. By combining transition matrix 2010 with minimum transition time matrix 1010 and hash table 800 devices in a common room can be identified and spatial separation of rooms estimated. Heuristic analysis of aspects of the sensor and training data can be used to estimate a classification for the room associated with each device (e.g., home office, kitchen, bedroom, office, conference room, hallway, entrance). For example, sensor data indicating that D4 is often the last device to sense a person at night and the first device to sense a person in the morning can indicate a bedroom in a smart home or the lobby of an office building. In this way a central controller 150 (e.g. a smart router or cloud based security system) can build a model for the layout of the enclosed space, that can be based in part on training data gathered when a single occupant is present.

While the above description contains many specificities, these should not be construed as limitations on the scope of any embodiment, but as exemplifications of various embodiments thereof. Many other ramifications and variations are possible within the teachings of the various embodiments.

Thus the scope should be determined by the appended claims and their legal equivalents, and not by the examples given.

The invention claimed is:

1. A computer implemented method for estimating the number of people in a region within an enclosed space comprising:
    obtaining a set of sensor data from a plurality of devices within a network of devices, wherein the set of sensor data comprises for each device in the plurality of devices corresponding sensor data indicative of a measure of occupancy within at least a portion of the region,
    obtaining a single occupancy criterion comprising a plurality of single occupant characteristics,
        wherein the single occupancy criterion functions to identify whether a candidate subset of the set of sensor data can be accounted for by a single occupant,
        wherein the single occupancy criterion further comprises a test based on the plurality of single occupancy characteristics, and wherein the single occupancy criterion is satisfied by the candidate subset of the set of sensor data when the candidate subset passes the test,
    processing one or more subsets of the set of sensor data according to the single occupancy criterion,
        wherein the processing identifies a set of subsets of devices such that for each subset of devices in the set of subsets of devices the corresponding subset of the set of sensor data satisfies the single occupancy criterion, and such that each device in the plurality of devices is included in at least one subset of devices in the set of subsets of devices, and
    estimating the number of people in the region within the enclosed space according to the number of subsets of devices in the set of subsets of devices.

2. The method of claim 1:
    wherein each of the plurality of single occupant characteristics is a rule operable to be evaluated on the candidate subset of the set of sensor data and which when satisfied by the candidate subset of the set sensor data indicates that the candidate subset of the set of sensor data can be accounted for by a single occupant, and
    wherein at least one of the plurality of single occupant characteristics is generated by a computer and based on processing training data from at least one of the plurality of devices by the computer.

3. The method of claim 1 wherein the single occupancy criterion comprises at least one single occupant characteristic that is a concurrent characteristic and at least one single occupant characteristic that is a sequential characteristic.

4. The method of claim 1 wherein at least one single occupant characteristic describes a minimum transition time between at least two devices from the plurality of devices that can be accounted for by a single occupant.

5. The method of claim 1 wherein at least one of the plurality of single occupant characteristics is generated at least in part by a computer coupled to the network of devices.

6. The method of claim 1:
    wherein the processing identifies the set of subsets of devices by iteratively performing, the steps of:
        a. generating a new subset of devices comprising the largest possible number of devices from the plurality of devices that are not already included in a subset of devices in the set of subsets of devices, and such that the single occupancy criterion is satisfied by the corresponding subset of the set of sensor data for all devices in the new subset of devices, b. adding the new subset of devices to the set of subsets of devices.

7. The method of claim 1 wherein each of the plurality of single occupant characteristics defines how to generate a corresponding score when evaluated on the candidate subset of the set of sensor data, and wherein the test defines a scoring criterion for passing the test, the scoring criterion using the score corresponding to at least one of the plurality of single occupancy characteristics.

8. The method of claim 1 wherein for each of the plurality of devices the corresponding sensor data is obtained in short range wireless signals having a range of less than 800 meters.

9. The method of claim 1 wherein the network of devices is a local area network and wherein the processing to identify the set of subsets of devices is performed by a computer that is part of the local area network.

10. The method of claim 1 further comprising: estimating the number of people in the region according to the number of subsets of devices in the set of subsets of devices and according to the number of subsets of devices in the set of subsets of devices at an earlier time.

11. The method of claim 1 wherein the test in the single occupancy criterion is based on at least four single occupant characteristics.

12. The method of claim 1 further comprising:
prior to generating the set of subsets of devices,
varying a detection threshold to generate a varied detection threshold, wherein the varied detection threshold is based at least in part on a previous estimate of the number of people in the region, and processing at least some of the sensor data according to the varied detection threshold.

13. The method of claim 1
wherein at least one of the plurality of single occupant characteristics is computed based on processing training data by a computer coupled to gather the training data form one or more of the plurality of devices upon satisfaction of a training criterion, and
wherein the training criterion comprises a condition for the satisfaction of the training criterion.

14. The method of claim 2 wherein at least one single occupant characteristic in the single occupancy criterion is a rule indicating one or more combinations of sensor data that cannot be accounted for by a single occupant and thereby defining one or more combinations of sensor data that cannot satisfy the single occupancy criterion.

15. The method of claim 2 wherein the test is passed by the candidate subset of the set of sensor data when each of the plurality of single occupant characteristics are satisfied by the candidate subset of the set of sensor data.

16. The method of claim 2 further comprising:
estimating the number of people in the region according the number of subsets of devices in the set of subsets of devices and a previous estimate of the number of people in the region.

17. A non-transitory computer readable medium containing instructions stored therein for causing a computer processor to perform a method for estimating the number of people in a region of an enclosed space, comprising:

instructions for obtaining sensor data from a plurality of devices within a network of devices, the sensor data being indicative of occupancy within at least a portion of the region, instructions for obtaining a single occupancy criterion comprising a plurality of single occupant characteristics each being a rule which when satisfied by a candidate subset of the sensor data corresponding to a candidate set of devices from the plurality of devices indicates that the candidate subset of the sensor data can be accounted for by a single occupant, wherein the single occupancy criterion is satisfied by the candidate subset of the sensor data when a combination of the plurality of single occupant characteristics is satisfied by the candidate subset of the sensor data, wherein the combination is defined in the single occupancy criterion, instructions for processing one or more subsets of the sensor data according to the single occupancy criterion, to identify a set of subsets of devices such that for each subset of devices in the set of subsets of devices the corresponding subset of the sensor data satisfies the single occupancy criterion, and such that each device in the plurality of devices is included in at least one subset of devices in the set of subsets of devices, and instructions for estimating the number of people in the region of the enclosed space based on the number of subsets of devices in the set of subsets of devices.

18. The non-transitory computer readable medium of claim 17 further comprising:

instructions for obtaining occupancy data indicative of occupancy in the region, instructions for evaluating a training criterion on the occupancy data to generate a result indicating the number of people in the region, and based at least in part on the result, obtaining training data from one or more of the plurality of devices, instructions for processing the training data to generate a single occupant characteristic, and instructions for adding the single occupant characteristic to the plurality of single occupant characteristics in the single occupancy criterion.

19. The non-transitory computer readable medium of claim 17 further comprising:

instructions for generating the at least one of the plurality of single occupant characteristics by processing training data from the plurality of devices.

20. The non-transitory computer readable medium of claim 17 further comprising:

instructions for estimating the number of people of the region in the enclosed space based on the number of subsets of devices in the set of subsets of devices and based on a previous estimate of the number of people in the region of the enclosed space.

21. A central controller comprising: at least one processor; and memory storing computer-readable instructions that, when executed by the at least one processor, cause the central controller to:

obtain sensor data from a plurality of devices, wherein the sensor data from each device of the plurality of devices is indicative of a measure of occupancy within at least a portion of a region in an enclosed space, access a single occupancy criterion, comprising a test based on a plurality of single occupant characteristics, and which when satisfied by a candidate subset of the sensor data corresponding to a candidate subset of devices from the plurality of devices indicates that the candidate subset of the sensor data can be accounted for by a single occupant, wherein the single occupancy criterion is satisfied for the candidate subset of the sensor data when the test is passed by the candidate subset of the sensor data, process the single occupancy criterion using one or more subsets of devices from the plurality of devices, to generate a set of subsets of devices such that for each subset of devices in the set of subsets of devices the corresponding subset of the sensor data from all devices in the each subset of devices satisfies the single occupancy criterion, and estimate the number of people in the region in the enclosed space based on the number of subsets of devices in the set of subsets of devices.

22. The central controller of claim 21 wherein the single occupancy criterion comprises at least one single occupant characteristic that is generated at least in part by processing training data form at least one of the plurality of devices at the central controller.

23. The central controller of claim 21 wherein the computer-readable instructions, when executed by the at least one processor, further cause the central controller to compute the set of subsets of devices by:

iteratively performing, until all devices in the plurality of devices are included in a subset in the set of subsets of devices, the steps of:

a. generating a largest possible subset of devices comprising devices from the plurality of devices that are not already included in a subset of devices in the set of subset of devices and such that the single occupancy criterion is satisfied by the combined sensor data for all devices in the largest possible subset, b. adding the largest possible subset to the set of subsets of devices.

24. The central controller of claim 21 wherein at least one of the single occupant characteristics is based processing training data by a computer operable coupled to receive the training data from one or more of the plurality of devices.

25. The central controller of claim 21 wherein at least one of the single occupant characteristics is based on processing training data by the central controller.

26. The central controller of claim 21 wherein the central controller is located in a local area network controller and wherein the sensor data for at least some of the plurality of devices is gathered from data packets transmitted by the at least some of the plurality of devices through the local area network controller.

27. A computer implemented method for estimating the number of people in a region of an enclosed space comprising:

obtaining a set of sensor data, indicative of occupancy within at least some of the region, and comprising for each of a plurality of devices within a network of devices corresponding sensor data, obtaining a single occupancy criterion comprising a plurality of single occupant characteristics, wherein upon processing at least some of the set of sensor data according to the single occupancy criterion, the single occupancy criterion functions to identify whether the at least some of the set of sensor data can be accounted for by a single occupant, wherein the single occupancy criterion further comprises a set of rules for the satisfaction of the single occupancy criterion, the set of rules being based at least in part on at least some of the plurality of single occupancy characteristics processing one or more subsets of the set of sensor data according to the single occupancy criterion, to compute a set of subsets of devices such that for each subset of devices in the set of subsets of devices the corresponding subset of the set of sensor data satisfies the single occupancy criterion, and such that each device in the plurality of devices is included in at least one subset of devices in the set of subsets of devices, and estimating the number of people in the region of the enclosed space based on the number of subsets of devices in the set of subsets of devices.

28. The method of claim 27 wherein one or more of the set of rules are generated at least in part by processing training data by a computer operably coupled to receive the training data from the network of devices.

29. The method of claim 27 wherein at least one of the set of rules is based on processing training data from a second network of devices located in a second enclosed space.

30. The method of claim 27 further comprising the steps of, prior to computing the set of subsets of devices, modifying one or more of the set of rules based on a previous estimate of the number of people in the region of the enclosed space.

* * * * *